United States Patent
Avendano et al.

(10) Patent No.: US 10,861,210 B2
(45) Date of Patent: Dec. 8, 2020

(54) TECHNIQUES FOR PROVIDING AUDIO AND VIDEO EFFECTS

(71) Applicant: Apple Inc., Cupertino, CA (US)

(72) Inventors: Carlos M. Avendano, Campbell, CA (US); Sean A. Ramprashad, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 287 days.

(21) Appl. No.: 16/033,111

(22) Filed: Jul. 11, 2018

(65) Prior Publication Data

US 2018/0336713 A1   Nov. 22, 2018

Related U.S. Application Data

(63) Continuation-in-part of application No. 15/908,603, filed on Feb. 28, 2018.

(51) Int. Cl.
  *G10L 21/013* (2013.01)
  *G06T 13/20* (2011.01)
  (Continued)

(52) U.S. Cl.
  CPC ............ *G06T 13/205* (2013.01); *G06T 13/40* (2013.01); *G10L 21/003* (2013.01); *G10L 21/013* (2013.01); *G10L 2021/0135* (2013.01)

(58) Field of Classification Search
  None
  See application file for complete search history.

(56) References Cited

U.S. PATENT DOCUMENTS 5,745,650 A * 4/1998 Otsuka .................... G10L 13/10
  704/201
6,144,938 A * 11/2000 Surace .................. G10L 13/033
  704/257

(Continued)

FOREIGN PATENT DOCUMENTS

WO   2013152453      10/2013
WO   2015/162072 A2  10/2015

(Continued)

OTHER PUBLICATIONS

"U.S. Appl. No. 62/399,048", filed Jun. 12, 2016.

(Continued)

*Primary Examiner* — Neeraj Sharma
(74) *Attorney, Agent, or Firm* — Kilpatrick Townsend & Stockton LLP

(57) ABSTRACT

Embodiments of the present disclosure can provide systems, methods, and computer-readable medium for providing audio and/or video effects based at least in part on facial features and/or voice feature characteristics of the user. For example, video and/or an audio signal of the user may be recorded by a device. Voice audio features and facial feature characteristics may be extracted from the voice audio signal and the video, respectively. The facial features of the user may be used to modify features of a virtual avatar to emulate the facial feature characteristics of the user. The extracted voice audio features may modified to generate an adjusted audio signal or an audio signal may be composed from the voice audio features. The adjusted/composed audio signal may simulate the voice of the virtual avatar. A preview of the modified video/audio may be provided at the user's device.

20 Claims, 13 Drawing Sheets

(51) Int. Cl.
*G06T 13/40* (2011.01)
*G10L 21/003* (2013.01)

(56) References Cited

U.S. PATENT DOCUMENTS

| | | | |
|---|---|---|---|
| 6,686,918 B1 | 2/2004 | Cajolet et al. | |
| 6,757,362 B1* | 6/2004 | Cooper | H04M 3/527 379/88.01 |
| 7,659,896 B2 | 2/2010 | Hoddie et al. | |
| 7,669,134 B1 | 2/2010 | Christie et al. | |
| 8,249,305 B2 | 8/2012 | Kondo et al. | |
| 8,509,458 B2 | 8/2013 | Nakamura et al. | |
| 8,648,865 B2 | 2/2014 | Dawson et al. | |
| 8,694,899 B2 | 4/2014 | Goossens et al. | |
| 8,745,152 B2 | 6/2014 | Rapo | |
| 9,839,844 B2 | 12/2017 | Dunstan et al. | |
| 9,864,547 B2 | 1/2018 | Ishiguro et al. | |
| 9,930,310 B2 | 3/2018 | Lindahl et al. | |
| 2003/0045274 A1 | 3/2003 | Nishitani | |
| 2003/0187635 A1* | 10/2003 | Ramabadran | G10L 19/06 704/217 |
| 2004/0161157 A1 | 8/2004 | Sato et al. | |
| 2004/0179037 A1 | 9/2004 | Blattner et al. | |
| 2004/0250210 A1 | 12/2004 | Huang et al. | |
| 2005/0033582 A1* | 2/2005 | Gadd | G06Q 30/02 704/277 |
| 2005/0264647 A1 | 12/2005 | Rzeszewski et al. | |
| 2006/0209076 A1 | 9/2006 | Maeng | |
| 2006/0239471 A1 | 10/2006 | Mao et al. | |
| 2007/0012167 A1 | 1/2007 | Bang et al. | |
| 2007/0013539 A1 | 1/2007 | Choi et al. | |
| 2007/0115349 A1 | 5/2007 | Currivan et al. | |
| 2007/0146360 A1 | 6/2007 | Clatworthy et al. | |
| 2007/0260984 A1 | 11/2007 | Marks et al. | |
| 2008/0147413 A1* | 6/2008 | Sobol-Shikler | G10L 13/033 704/278 |
| 2008/0231686 A1 | 9/2008 | Redlich | |
| 2008/0279272 A1 | 11/2008 | Saito et al. | |
| 2008/0284779 A1 | 11/2008 | Gu et al. | |
| 2008/0298705 A1 | 12/2008 | Jeong | |
| 2008/0314232 A1 | 12/2008 | Hansson et al. | |
| 2009/0128567 A1 | 5/2009 | Shuster et al. | |
| 2009/0128657 A1 | 5/2009 | Ozluturk | |
| 2009/0212637 A1 | 8/2009 | Baarman et al. | |
| 2009/0323984 A1 | 12/2009 | Yuasa | |
| 2010/0115022 A1 | 5/2010 | Rapo | |
| 2010/0153722 A1 | 6/2010 | Bauchot et al. | |
| 2010/0214422 A1 | 8/2010 | Iwamura et al. | |
| 2011/0058056 A1 | 3/2011 | Lindahl et al. | |
| 2011/0197201 A1 | 8/2011 | Yoo et al. | |
| 2011/0248992 A1 | 10/2011 | Van Os et al. | |
| 2012/0185542 A1 | 7/2012 | Vyrros et al. | |
| 2013/0231924 A1* | 9/2013 | Zakarauskas | G10L 19/0017 704/207 |
| 2013/0254320 A1 | 9/2013 | Bhalerao et al. | |
| 2014/0092130 A1 | 4/2014 | Anderson et al. | |
| 2014/0152758 A1* | 6/2014 | Tong | H04M 1/72555 348/14.02 |
| 2014/0154659 A1 | 6/2014 | Otwell | |
| 2014/0282000 A1 | 9/2014 | Almaghlouth | |
| 2015/0156598 A1 | 6/2015 | Sun et al. | |
| 2015/0237307 A1 | 8/2015 | Fujii | |
| 2015/0347748 A1 | 12/2015 | Krstic et al. | |
| 2015/0379752 A1 | 12/2015 | Li et al. | |
| 2016/0006987 A1 | 1/2016 | Li et al. | |
| 2016/0042548 A1 | 2/2016 | Du et al. | |
| 2016/0072997 A1* | 3/2016 | Tsujimoto | H04N 5/232 367/197 |
| 2016/0110922 A1 | 4/2016 | Haring | |
| 2016/0361653 A1 | 12/2016 | Zhang et al. | |
| 2017/0069124 A1 | 3/2017 | Tong et al. | |
| 2017/0301347 A1* | 10/2017 | Fuhrman | G10L 15/063 |
| 2017/0358117 A1 | 12/2017 | Goossens et al. | |
| 2018/0335927 A1 | 11/2018 | Anzures et al. | |
| 2019/0013036 A1* | 1/2019 | Graf | G10L 21/0216 |

FOREIGN PATENT DOCUMENTS

| | | |
|---|---|---|
| WO | 2015/183456 A1 | 12/2015 |
| WO | 2016154800 | 10/2016 |

OTHER PUBLICATIONS

"U.S. Appl. No. 62/399,241", filed Sep. 23, 2016, 30 pages.
"U.S. Appl. No. 62/507,177", filed May 16, 2017.
"U.S. Appl. No. 62/556,412", filed Sep. 9, 2017.
"U.S. Appl. No. 62/557,121", filed Sep. 11, 2017.
"I Dream of Jeannie Blink", Youtube, Available Online at: "https://www.youtube.com/watch?v=ma1eyZUCwLQ"), Oct. 23, 2011.
"Introduction to the Messenger Platform", Available online at: https://developers.facebook.com/docs/messenger-platform/introduction/, Accessed from Internet on Apr. 5, 2019, 3 pages.
U.S. Appl. No. 15/906,228 , "Non Final Office Action", dated Aug. 21, 2019, 12 pages.
U.S. Appl. No. 15/908,603 , "Final Office Action", dated Sep. 17, 2019, 23 pages.
Valenti, Roberto et al., "Sonify Your Face: Facial Expressions for Sound Generation." MM'10, Oct. 25-29, 2010, Firenze, Italy.
"Non-Final Office Action," dated Feb. 6, 2020 in U.S. Appl. No. 15/908,603. 23 pages.
U.S. Appl. No. 15/908,603 , "Non-Final Office Action", dated Apr. 3, 2019, 21 pages.
PCT/US2019/019546 , "International Search Report and Written Opinion", dated May 10, 2019, 11 pages.
PCT/US2019/019554 , "International Search Report and Written Opinion", dated May 13, 2019, 10 pages.
European Patent Application No. 17174969.0, Partial European Search Report dated Jul. 26, 2017. 13 pages.
PCT International Search Report and Written Opinion for International Application No. PCT/US2017/034340, dated Jul. 19, 2017. 10 pages.
Complete Guide—Messenger Platform—Technical Implementation, downloaded May 27, 2016, https://developers.facebook.com/docs/messenger-platform/implementation, 18 pages.
Getting Started—Messenger Platform—downloaded May 27, 2016, http://developers.facefoof.com/docs/messenger-platform/quickstart, 6 pages.
Google launches time-saving keyboard for iPhones, May 12, 2016. 2 pages.
Business Insider—Snapchat now lets you add fun stickers to photos and videos, May 23, 2016. 4 pages.
Non-Final Office Action dated Mar. 28, 2012 in U.S. Appl. No. 12/556,380. 17 pages.
Final Office Action dated Sep. 21, 2012 in U.S. Appl. No. 12/556,380. 20 pages.
Non-Final Office Action dated Jun. 7, 2013 in U.S. Appl. No. 12/556,380. 22 pages.
Final Office Action dated Dec. 17, 2013 in U.S. Appl. No. 12/556,380. 28 pages.
Non-Final Office Action dated Jul. 2, 2014 in U.S. Appl. No. 12/556,380. 30 pages.
Final Office Action dated Feb. 20, 2015 in U.S. Appl. No. 12/556,380. 33 pages.
Notice of Allowance dated Jan. 18, 2018 in U.S. Appl. No. 12/556,380. 6 pages.
Corrected Notice of Allowance dated Jan. 18, 2018 in U.S. Appl. No. 12/556,380. 13 pages.
Advisory Action dated Dec. 13, 2012 in U.S. Appl. No. 12/556,380. 2 pages.
Notice of Allowance dated Dec. 15, 2017 in U.S. Appl. No. 12/556,380. 9 pages.
"Final Office Action," dated Aug. 7, 2020 in U.S. Appl. No. 15/908,603. 24 pages.
"International Preliminary Report on Patentability," dated Sep. 10, 2020 in International Application No. PCT/US2019/019554.

* cited by examiner

TECHNIQUES FOR PROVIDING AUDIO AND VIDEO EFFECTS

CROSS-REFERENCES TO RELATED APPLICATIONS

This patent application is a continuation-in-part of U.S. patent application Ser. No. 15/908,603, filed Feb. 28, 2018, which is incorporated by reference herein for all purposes.

BACKGROUND

Multimedia content, such as emojis, can be sent as part of messaging communications. The emoji's can represent a variety of predefined people, objects, actions, and/or other things. Some messaging applications allow users to select from a predefined library of emojis which can be sent as part of a message that can contain other content (e.g., other multimedia and/or textual content). Animojis are one type of this other multimedia content, where a user can select an avatar (e.g., a puppet) to represent themselves. The animoji can move and talk as if it were a video of the user. Animojis enable users to create personalized versions of emoji's in a fun and creative way.

SUMMARY

Embodiments of the present disclosure can provide systems, methods, and computer-readable medium for audio and/or video effects. For example, a method for providing audio and video effects is enabled. The method may be performed at an electronic device having at least a camera and a microphone. The method may comprise displaying a virtual avatar generation interface. The method may further comprise displaying first preview content of a virtual avatar in the virtual avatar generation interface. In some embodiments, the first preview content of the virtual avatar may correspond to real-time preview video frames of a user headshot in a field of view of the camera and associated headshot changes in an appearance. The method may further comprise, while displaying the first preview content of the virtual avatar, detecting an input in the virtual avatar generation interface. The method may further comprise, in response to detecting the input in the virtual avatar generation interface: capturing, via the camera, a video signal associated with the user headshot during a recording session and capturing, via the microphone, a voice audio signal during the recording session. In response to detecting the input in the virtual avatar generation interface, and in response to detecting expiration of the recording session, the method may further comprise: transforming the voice audio signal into a first set of voice audio features, the first set of voice audio features including at least one speech formant of the voice audio signal; identifying a feature set of a predetermined voice audio signal associated with the virtual avatar; generating a second set of voice audio features based at least in part on the first set of voice audio features and the feature set of the predetermined voice audio signal associated with the virtual avatar, the second set of voice audio features including a modified version of the at least one speech formant of the voice audio signal; and composing a modified voice audio signal based at least in part on the second set of voice audio features. The method may further comprise generating second preview content of the virtual avatar in the virtual avatar generation interface according to the video signal and the modified voice audio signal. The method may further comprise presenting the second preview content in the virtual avatar generation interface.

In some embodiments, the first set of voice audio features may include an envelope and fine structure of the voice audio signal. A smooth-frequency-envelope (also referred herein as "an envelope") may represent a magnitude of the voice audio signal frequency as the magnitude of the frequency varies over time. The envelope may represent the slowly-varying primary resonances of the vocal tract of the human speaker as a function of frequency in addition to overall gain or energy of the signal. Some of these resonances are known as "formants." A fine structure of the audio signal may include at least one of a finer resolution frequency and/or a phase of the voice audio signal. The fine structure may include more long-term correlations over time, including pitch, which manifests as a very fine periodic structure over frequency. In some embodiments, transforming the voice audio signal into the first set of voice audio features may include utilizing a short-term Fourier transform. For example, the identification of an envelope may utilize the short-term Fourier transform. In some embodiments, composing the modified voice audio signal may include utilizing an inverse short-term Fourier transform.

In some embodiments, an electronic device is disclosed, the electronic device comprising a speaker, a microphone and one or more processors in communication with the speaker and the microphone. In some embodiments, the one or more processors are configured to perform operations. The operations may comprise capturing, utilizing the microphone, a voice audio signal corresponding to a user. The operations may further comprise transforming the voice audio signal into a first set of voice audio features, the first set of voice audio features including a formant of the voice audio signal. The operations may further comprise identifying a feature set of a predetermined voice audio signal associated with the virtual avatar. The operations may further comprise generating a second set of voice audio features based at least in part on the first set of voice audio features and the feature set of the predetermined voice audio signal associated with the virtual avatar. The operations may further comprise composing a modified voice audio signal according to the second set of voice audio features. The operations may further comprise presenting, at the speaker of the electronic device, the modified voice audio signal.

In some embodiments, the feature set of the predetermined voice audio signal may be based at least in part on a type of the virtual avatar. The type of the virtual avatar may be received based at least in part a user selection of an avatar type selection option presented on a user interface of the electronic device. In some embodiments, the first set of voice audio features may include a formant of the voice audio signal, and the second set of voice audio features may be generated based at least in part on shifting the formant of the first set of voice audio features. In some embodiments, the second set of voice audio features may be generated by removing a formant, widening a formant width over frequency, adding new formants (e.g., as a function of the position and width this and possibly other formants), changing the energy (e.g. gain) associated with a formant, and/or the like. Such modification can also be driven by other features of the voice audio signal such as the strength of pitch and the relative balance between low and high frequency components of the voice. In some embodiments, the second set of voice audio features generated may modify the voice audio signal to simulate the predetermined voice audio signal associated with the virtual avatar. In some embodiments, the first set of voice audio features may include an envelope and/or a fine structure of the voice audio signal. The envelope may represent a slowly-varying magnitude of the voice audio signal over time and frequency. In some embodiments, the envelope may include primary resonances of the vocal tract known as "formants." In some embodiments, the first set of audio features may additionally include fine structure which may represent at least one of a finer resolution frequency or a phase representation of the voice audio signal. In some embodiments, the second set of voice audio features may be generated based at least in part on modifying the phase of the voice audio signal, wherein modifying the phase of the voice audio signal may cause the modified voice audio signal composed from the second set of voice audio features to simulate the predetermined voice audio signal associated with the virtual avatar.

The operations may further include generating a machine-learning model from past signal modifications associated with individually modifying a plurality of voice audio signals associated with a plurality of users to substantially match the predetermined voice audio signal associated with the virtual avatar. In some embodiments, the machine-learning model may be configured to receive a voice audio signal feature set as input and produce a resultant voice audio signal feature set as output. The operations may further include providing, to the machine-learning model, the first set of voice audio features associated with the voice audio signal corresponding to a user. The operations may further include obtaining, from the machine-learning model, the second set of voice audio features, wherein the modified voice audio signal composed from the second set of voice audio features may cause the voice audio signal of the user to be substantially match a vocal signal associated with the virtual avatar. In some embodiments, the machine-learning model may utilize input voice audio signals that utter the same word(s) as a target signal in order to learn how to modify the voice audio signal to more substantially match the target signal.

In some embodiments, the electronic device further comprises a camera, and the operations further include capturing, utilizing the camera, a video signal associated with a face in a field of view of the camera. The operations may further comprise extracting facial feature characteristics associated with the face from the video signal. The operations may further comprise generating adjusted facial metadata based at least in part on the facial feature characteristics and the modified voice audio signal. In some embodiments, the modified voice audio signal is presented with a visual representation of the virtual avatar in the virtual avatar generation interface, the visual representation of the virtual avatar being presented based at least in part on the adjusted facial metadata.

In some embodiments, a computer-readable storage medium may store computer-executable instructions that, when executed by one or more processors, configure the one or more processors to perform operations. The operations may comprise receiving, at a virtual avatar generation interface, a selection associated with a virtual avatar, the virtual avatar being associated with particular vocal characteristics. The operations may further comprise capturing, utilizing a microphone and the virtual avatar generation interface, a voice audio signal of a user. The operations may further comprise transforming the voice audio signal of the user into a first set of signal features, the first set of signal features including at least one of: an envelope identifying magnitude changes of the voice audio signal over time, a frequency of the voice audio signal, or a phase of the voice audio signal. The operations may further comprise generating a second set of voice audio features based at least in part on the first set of signal features and the particular vocal characteristics associated with the virtual avatar. The operations may further comprise composing a modified voice audio signal according to the second set of voice audio features, wherein the modified voice audio signal provides content of the voice audio signal of the user based at least in part on the particular vocal characteristics associated with the virtual avatar. The operations may further comprise presenting, at a speaker, the modified voice audio signal.

In some embodiments, the second set of voice audio features are generating based at least in part on replacing the phase with a predetermined phase associated with the virtual avatar. In some embodiments, transforming the voice audio signal of the user into a first set of signal features may utilize a short-term Fourier transform of the first set of signal features, and composing the modified voice audio signal according to the second set of voice audio features may utilize an inverse short-term Fourier transform of the second set of voice audio features.

In some embodiments, the operations further comprise identifying a formant of the voice audio signal based at least in part on the envelope and modifying the formant according to a window function, wherein modifying the formant according to the window function may cause the formant to widen or contract.

In some embodiments, the operations further comprise capturing, utilizing a camera, a video signal associated with a face in a field of view of the camera. The operations may further comprise extracting facial feature characteristics associated with the face from the video signal. The operations may further comprise generating adjusted facial metadata based at least in part on the facial feature characteristics and the modified voice audio signal. The operations may further comprise presenting, with the modified voice audio signal, a visual representation of the virtual avatar according to the adjusted facial metadata.

In some embodiments, the voice modifications described herein may vary from user to user based on an analysis of the user's voice. This analysis can be based in part on features obtained from the envelope structure of the user's voice. In particular, whether formants are shifted up in frequency or down in frequency may depend on the original position of a user's first or other formants.

The following detailed description together with the accompanying drawings will provide a better understanding of the nature and advantages of the present disclosure.

DETAILED DESCRIPTION

Figure 1:
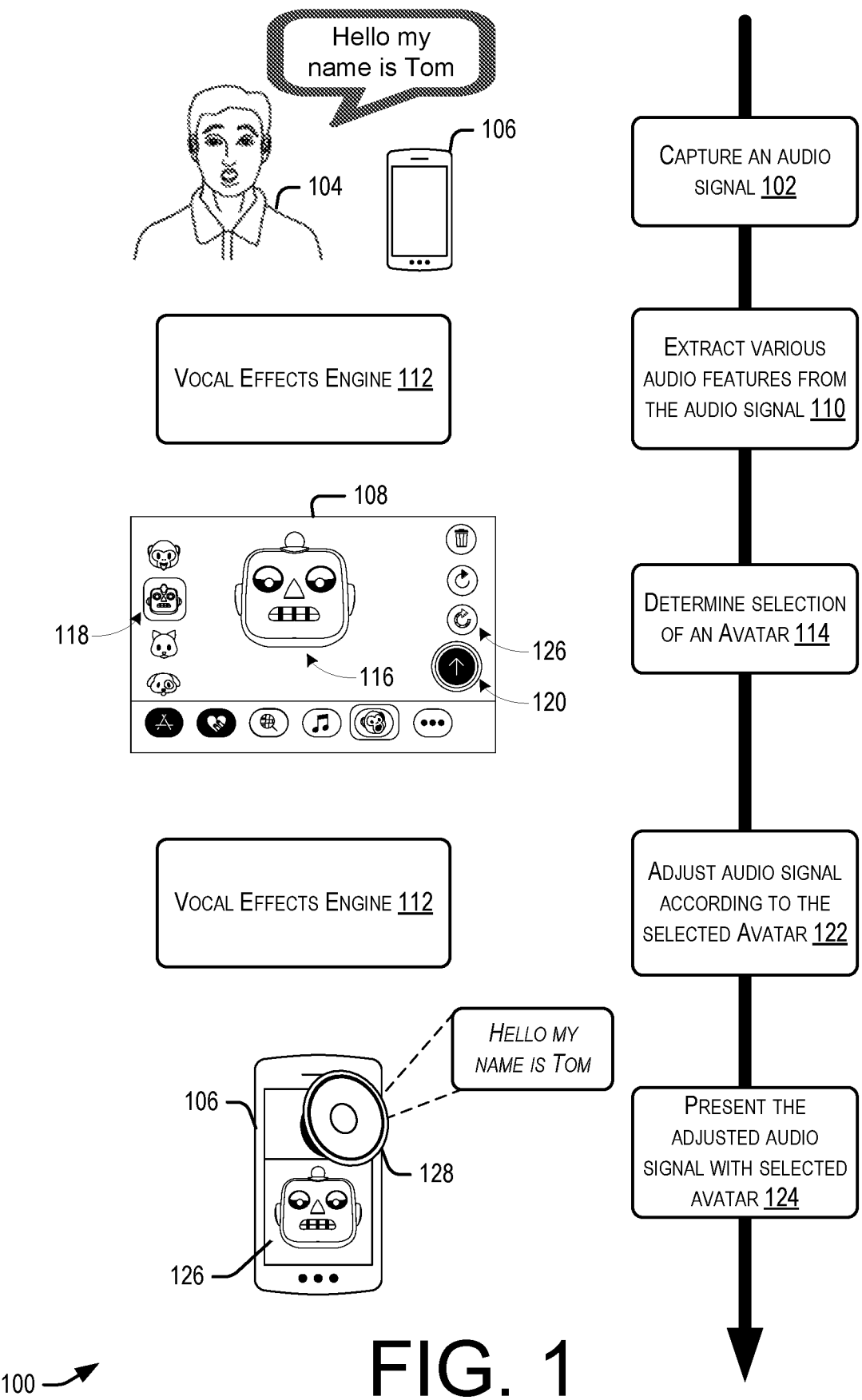
FIG. 1 is a simplified block diagram illustrating an example flow for providing audio effects techniques as described herein, according to at least one embodiment.

Certain embodiments of the present disclosure relate to devices, computer-readable medium, and methods for implementing various techniques for providing video and/or audio effects (e.g., revised and/or newly composed audio). In some embodiments, video effects and audio effects may be provided together based at least in part on one or both of facial expressions and audio characteristics (e.g., of a user's voice) of a recording. In other embodiments, audio effects alone may be implemented using a captured audio signal (e.g., the user's voice), or video effects alone may be implemented using a captured video. In some examples, the video effects and/or audio effects may be presented in a user interface (UI) configured to display a cartoon representation of a user (e.g., an avatar or digital puppet). Such an avatar that represents a user may be considered an "animoji," as it may look like an emoji character familiar to most smart phone users; however, it can be animated to mimic actual motions of the user. In some embodiments, a voice audio signal provided by the user may be modified to simulate a voice associated with a particular avatar/digital puppet and the modified audio signal may be provided alone, or with the modified video.

As a non-limiting example, a user of a computing device may be presented with a UI (e.g., an avatar generation interface) for generating an animoji (e.g., a video clip of an avatar with/without audio). The animoji can be limited to a predetermined amount of time (e.g., 10 second, 30 seconds, or the like), or the animoji can be unlimited. In the UI, a preview area may present the user with a real-time representation of their face, using an avatar character. Various avatar characters may be provided, and a user may even be able to generate or import their own avatars. The preview area may be configured to provide an initial preview of the avatar and a preview of the recorded video clip. Additionally, the recorded video clip may be previewed in its original form (e.g., without any video or audio effects) or it may be previewed with audio and/or video effects. In some cases, the user may select an avatar after the initial video clip has been recorded. The preview may then change from one avatar to another, with the same or different video effects and/or audio effects applied to it, as appropriate. For example, if the raw preview (e.g., original form, without effects) is being viewed, and the user switches avatar characters, the UI may be updated to display a rendering of the same video clip but with the newly selected avatar. In the preview, it will appear as if the avatar character is moving the same way the user moved during the recording, and speaking what the user said during the recording. In some embodiments, the audio signal provided by the user (e.g., a spoken phrase) may be modified and/or a new audio signal created to simulate the content of the user's audio signal in a voice associated with the selected avatar. Thus, in some embodiments, the preview will present the avatar character moving in the same way the user moved during the recording, while the words spoken by the user may be presented in a voice that matches, or substantially matches, the voice associated with the avatar (e.g., avatars might be associated with voices of different pitches, depths, and/or sound effects).

As a specific example, a user may select a first avatar (e.g., a unicorn head) via the UI, or a default avatar can be initially provided. The UI will present the avatar (in this example, the head of a cartoon unicorn if selected by the user or any other available puppet by default) in the preview area, and the device will begin capturing audio and/or video information (e.g., using one or more microphones and/or one or more cameras). In some cases, only video information is needed for the initial preview screen. The video information can be analyzed, and facial features can be extracted. These extracted facial features can then be mapped to the unicorn face in real-time, such that the initial preview of the unicorn head appears to mirror that of the user's. In some cases, the term real-time is used to indicate that the results of the extraction, mapping, rendering, and presentation are performed in response to each motion of the user and can be presented substantially immediately. To the user, it will appear as if they are looking in the mirror, except the image of their face is replaced with an avatar.

While the user's face is in the line of sight (e.g., the view) of a camera of the device, the UI will continue to present the initial preview. Upon selection of a record affordance (e.g., a virtual button) on the UI, the device may begin to capture video and/or an audio signal (e.g., of the user's voice, otherwise referred to as a "voice audio signal"). In some examples, a camera capturing the video and a microphone captures the audio signal. A special camera may be utilized that is capable of capturing 3-dimensional (3D) information as well. Additionally, in some examples, any camera may be utilized that is capable of capturing video. The video may be stored in its original form and/or metadata associated with the video may be stored. As such, the captured video may be different from the metadata stored. In some embodiments, during an initial preview, while the user's face is being presented as a puppet in real-time, the video data (e.g., metadata associated with the data) may be cached, while it is mapped to the puppet and presented. However, this data may not be stored permanently at all, such that the initial preview is not reusable or recoverable.

Alternatively, in some examples, once the user selects the record affordance of the UI, the video data and the audio data may be stored more permanently. The audio signal and video may analyzed, processed, etc., in order to provide the audio and video effects described herein. In some examples, the video may be processed to extract facial features (e.g., facial feature characteristics) and those facial features may be stored as metadata for the animoji video clip. The set of metadata may be stored with an identifier (ID) that indicates the time, date, and user associated with the video clip. Additionally, the audio signal may be stored with the same or other ID. Once stored, or in some examples—prior to storage, the system (e.g., processors of the device) may extract a set of voice audio features from the audio signal and facial feature characteristics from the video. The set of voice audio features may be utilized to make various modifications in a smooth-frequency-envelope, magnitude, pitch, timing, frequency, phase, etc. depending on a currently selected avatar. A smooth-frequency-envelope (also referred herein as "an envelope") may represent a magnitude of the voice audio signal frequency as the magnitude of the frequency varies over time. The envelope may represent the slowly-varying primary resonances of the vocal tract of the human speaker as a function of frequency in addition to overall gain or energy of the signal. Some of these resonances are known as "formants." A fine structure of the audio signal may include at least one of a finer resolution frequency and/or a phase of the voice audio signal. The fine structure may include more long-term correlations over time, including pitch, which manifests as a very fine periodic structure over frequency. Additionally, in some examples, the video metadata can also be adjusted depending on the currently selected avatar. In some examples, voice audio features and/or video metadata are extracted in real-time during the preview itself. The audio signal and/or video can be adjusted in part based on these real-time feature/metadata extractions.

Once the video and/or audio signal have been adjusted based at least in part on the extracted features/characteristics, a second preview of the puppet can be rendered. This rendering may be performed for each possible puppet, such as the user scrolls through and selects different puppets, the adjusted data is already rendered. Or the rendering can be performed after selection of each puppet. In any event, once the user selects a puppet, the second preview can be presented. The second preview will replay the video clip that was recorded by the user, but with the adjusted audio signal and/or video.

By way of example, the user may select a unicorn avatar. During a recording session initiated by the user, video may be captured by a camera of the device and/or an audio signal (corresponding to the user's voice) may be captured by a microphone of the device. If an audio signal is captured, voice audio features (e.g., the envelope, the fine structure of the voice audio signal) may be extracted and modified according to a feature set associated with the unicorn, an audio signal associated with the unicorn, and/or rules or logic associated with making modification based on the selection of the unicorn. The voice audio features may be modified (or a new audio signal composed) based on those modifications. The resultant audio signal may be based on the user's original audio signal but the voice may be modified to sound more like a voice associated with the unicorn. The modifications performed may be different for different users, depending in part on the original characteristics of the user's voice. If the user then selected a different avatar (e.g., a robot avatar), the user's original audio signal may be modified based on a feature set associated with the robot avatar, an audio signal associated with the robot avatar, and/or rules or logic associated with making modification based on the selection of the robot avatar. Thus, the user's audio signal may be modified (or a new audio signal composed) which may be based on the user's original audio signal but modified to simulate the voice associated with the robot avatar.

Although some examples provided herein discuss video effects being performed along with audio effects, it should be appreciated that the same or similar audio effects may be provided in examples that do not include video at all. That is, a user may select an avatar (or a character selection) that is associated with a particular voice. The user may then speak into the microphone of the device and the audio signal may be captured. Voice audio features of the audio signal (e.g., an envelope, fine structure, or any suitable characteristic of the voice audio) may be extracted and at least some of the extracted voice audio features may be adjusted in order to adjust the audio signal (or compose a new signal) to more closely match (or exactly match) the voice associated with the character. The particular adjustments performed can depend on features of the original voice audio signal and how they differ from the voice associated with the desired character.

FIG. 1 is a simplified block diagram illustrating an example flow 100 for providing audio effects techniques as described herein, according to at least one embodiment. At block 102, a user 104 may utilize a microphone of device 106 to capture an audio signal (also referred to as a voice audio signal). The audio signal may represent the sound waves and various speech characteristics of the voice of the user 104 given the content (e.g., words, accent, inflections, etc.) being provided. As a non-limiting example, the user 104 may enter into a recording session through one or more selections made at a user interface (e.g., a virtual avatar generation interface 108). During the recording session, device 106 may capture an audio signal of the user 104 in various ways. For example, the user 104 may speak into the microphone of the device 106 after selecting a particular recording option at the device 106. In some examples, an audio signal of the user 104 may be captured simultaneously with video of the user 104 using two different devices (e.g., a microphone and a camera) of the device 106. Although not depicted, it should be appreciated that video metadata of the captured video can also be analyzed and utilized in any suitable manner in conjunction with the audio effects described herein. By way of example, the video metadata may be analyzed to identify facial expressions of the user 104. Once identified, the video metadata may be utilized to modify visual representations of an avatar such that the avatar appears to utilize similar facial expressions of the user.

At block 110, various voice audio features (e.g., audio characteristics of the user's voice) may be extracted (e.g., by the vocal effects engine 112) from the audio signal. By way of example, the audio signal may be transformed into a feature set that includes an envelope and a fine structure of the audio signal. An "envelope," as discussed above, represents the slowly-varying magnitude of a sound wave of the audio signal over frequency. The envelope evolves over time. An envelope modification algorithm may be utilized to extract and/or modify an envelope that includes the primary resonances of the vocal audio signal. An example of an envelope modification algorithm is discussed further below with respect to FIG. 6. The extracted envelope may include one or more formants (also referred to as "speech formant(s)") which individually represent spectral peaks of the sound spectrum, or said another way, a formant represents a harmonic note of the audio signal that is augmented by a resonance. Such formants may have general frequency ranges and bandwidths for a human and can be identified from the resonances by noting the center frequencies and bandwidths of each of the resonances. Resonances can be described as functions of the geometry and volume of various parts of the anatomical structure of a person's vocal tract, and how this varies in time. An avatar may have a different set of general frequency ranges and bandwidths, which may be related in part to the general anatomy one may associate with the character, though in general there may be no such direct association. The "fine structure" of an audio signal (also referred to herein as "a residual") may include the remaining structure of the audio signal which includes correlations that go beyond the modeling capacity used to define the envelope. This fine structure may include at least the magnitude, pitch, and/or the phase of the sound wave of the audio signal over time. In some examples, the captured audio may be stored and the audio features extracted after storage. It is also possible for the extraction of the audio features to be done in real-time while the recording session is still in process.

At block 114, the vocal effects engine 112 may determine an avatar that has been selected. In some embodiments, the user 104 may select (e.g., via the virtual avatar generation interface) a particular avatar (e.g., corresponding to robot 116). This selection may occur prior to capturing the audio signal at block 102 and/or the selection may occur after capturing the audio signal at block 102.

By way of example, the user 104 may select a particular avatar (e.g., the robot 116) via option 118 of the virtual avatar generation interface 108. The user 104 may select a recording affordance (e.g., recording affordance 120) at the virtual avatar generation interface 108 to initiate a recording session and speak "Hello my name is Tom" into the microphone of the device 106. In some embodiments, this recording session may capture video and audio of the user 104, while in other embodiments, the recording session may capture audio of the user 104 alone. The recording session may end when user 104 selects the record affordance again (e.g., indicating a desire to end the recording), selects an end recording affordance (e.g., the record affordance may act as an end recording affordance while recording), or based at least in part on expiration of a time period (e.g., 10 seconds, 30 seconds, or the like). In some cases, this time period may be automatically predetermined, while in others, it may be user selected (e.g., selected from a list of options or entered in free form through a text entry interface). Alternatively, the user 104 may select the recording affordance 120 and to initiate the recording session prior to selecting the option 118 to select an avatar. In still further examples, the user 104 may select an avatar, begin the recording session, and subsequent to the conclusion of the recording session, the user 104 may select an avatar different from the one initially selected. Thus, the vocal effects engine 112 may determine an avatar that has been selected prior to the recording, at some point after the recording has concluded, upon selection of a preview option to listen to the recording, or at any suitable time.

At block 122, the vocal effects engine 112 may adjust the audio signal according to the selected avatar. As a non-limiting example, the vocal effects engine 112 may utilize the extracted audio feature set of the audio signal and modify one or more features (e.g., a formant, a magnitude, a frequency/pitch, a phase, etc.) depending on a feature set associated with the selected avatar. In some embodiments, one or more features may be replaced and/or added to the audio feature set of the audio signal. As a specific example, the feature set of the audio signal may include an envelope and/or a residual features. Such features may correspond to extracted parameters associated with a magnitude, a frequency, and/or a phase of the sound wave of the audio signal over time. By adjusting such features (e.g., shifting speech formants of the envelope, changing the shape of formants, modifying and/or replacing phase parameters of the audio signal, adding formants, inverting formants, etc.) the audio signal may be adjusted (or a modified version of the audio signal may be composed). The adjusted (or composed) audio signal may cause the audio signal of the user 104 to substantially match a voice associated with the avatar. Thus, in the example depicted in FIG. 1, the audio signal of the user 104 may be adjusted to sound like the voice associated with the robot avatar. The adjustment of such features may depend on part on the characteristics of the user's original features. For example, the modification may or may not add a formant depending on the position, spacing, or shape of the user's original formants.

At block 124, the adjusted audio signal (or composed audio signal) may be presented with the selected avatar. By way of example, the user 104 may select a preview affordance 126 of the virtual avatar generation interface 108 after the recording session has concluded. The preview affordance may be utilized to indicate that user 104 wishes to watch a preview of the recording. One option could be to play the original recording without any audio (and in some cases, video) effects. However, another option could be to play a revised version of audio and/or video. In some embodiments, device 106 may present the selected avatar 126 (also called a puppet and/or "Animoji") on a screen. Device 106 may also be configured with speaker 128 that can play the adjusted audio signal.

Although a robot avatar is provided in FIG. 1 for illustrative purposes, there may be a variety of different animal (and other character) avatars available for selection by user 104. In some examples, each avatar may be associated with a particular pre-defined voice target that is associated with that avatar. For example, a dog may have a dog-like voice, a cat may have a cat-like voice, a pig may have a pig-like voice, a robot may have a robotic voice, etc. These avatar-specific voices may be pre-recorded or may be associated with particular frequency or audio characteristics such as general formant range(s), formant spacing(s), extra resonances due to an anatomical feature (e.g. large nose or snout), or the like. The vocal effect engine 112 is configured to utilize the audio signal provided by the user 104, along with the feature set (e.g., the frequency and/or audio characteristics) associated with the avatar to adjust (e.g., utilizing mathematical operations on the original audio signal, by composing a new audio signal based on the original audio signal and/or the feature set of the avatar) such that any user's voice can be transformed to sound like the selected avatar's voice. In some cases, each user's dog voice may sound different based at least in part on the particular audio transformation performed and the fact that each user has distinct vocal characteristics. In other examples, the vocal effect engine 112 may be configured to modify each user's voice to substantially match the dog's voice such that every user's modified audio signal will substantially sound like the dog's voice with few, if any, discernable differences. In other embodiments, the modified voice of different users becomes more character like while also preserving some of the users' underlying and unique identifiable characteristics. Thus, a dog voice for different users may be more dog-like yet discernably different for different users.

As a non-limiting example, a voice audio signal may be modified to be more cat-like by applying an upward shift or a proportional translation of the formant positions on the frequency scale. For an adult who may have a relatively low voice, the upward shift may be considerable higher than a person (e.g., a child) who already has a higher pitched, higher formant voice. In fact, for a person with a relatively higher pitched voice, a formant shift may be unnecessary. In contrast, to make each individual sound more like a large animal (e.g., an animal characterized by a deeper voice such as a bear) a higher downward shift may be required for a child than for a grown adult having a relatively deeper voice. In some embodiments, depending on the avatar selected, there could be a desired effect by adding a formant (e.g., a nasal component) which might be created something (real or perceived) for a character with a large truck or nose. Some avatars, such as a lizard, a snake, or a duck may be associated with a lisp.

Figure 2:
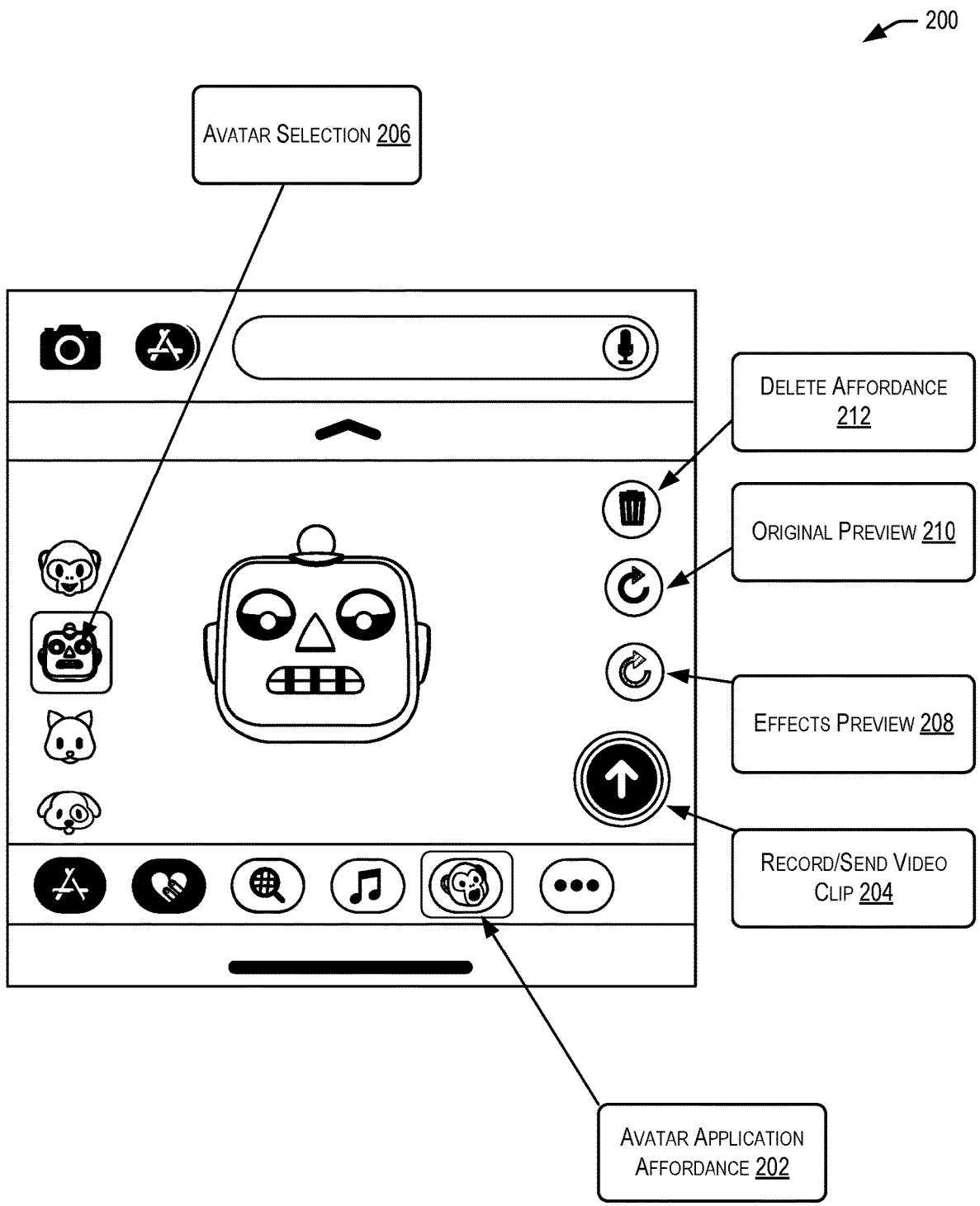
FIG. 2 is another simplified block diagram illustrating an example virtual avatar generation interface, according to at least one embodiment.

FIG. 2 is another simplified block diagram illustrating an example virtual avatar generation interface 200 (hereinafter, the "UI 200"), according to at least one embodiment. The UI 200 may be configured to enable a user generate an avatar according to the physical and/or audio characteristics of the user as discussed in the numerous examples provided herein. In some examples, UI 200 may look different (e.g., it may appear as a standard text (e.g., short messaging service (SMS)) messaging application) until an avatar application affordance 202 is selected. The avatar application can communicate with the video effects engine 308 and/or the vocal effects engine 310 discussed in connection with FIG. 3 to make requests for capturing, processing (e.g., extracting features, running logic, etc.), and adjusting audio and/video. For example, when the user selects a record affordance (e.g., record/send video clip affordance 204), the avatar application may make an application programming interface (API) call to an avatar control module (discussed in more detail in FIG. 12). The avatar control module may include the video effects engine 308 and/or the vocal effects engine 310 to begin capturing video and/or audio information using the appropriate hardware components. In some example, record/send video clip affordance 204 may be represented as a red circle (or a plain circle without the line shown in FIG. 2) prior to the recording session beginning. In this way, the affordance will look more like a standard record button. During the recording the session, the appearance of record/send video clip affordance 204 may be changed to look like a clock countdown or other representation of a timer (e.g., if the length of video clip recordings is limited). However, in other examples, the record/send video clip affordance 204 may merely change colors to indicate that the avatar application is recording. If there is no timer, or limit on the length of the recording, the user may need to select record/send video clip affordance 204 again to terminate the recording.

In some examples, a user may use avatar selection affordance 206 to select an avatar. This can be done before recording of the avatar video clip and/or after recording of the avatar video clip. When selected before recording, the initial preview of the user's motions and facial characteristics may be presented as the selected avatar. Additionally, the recording will be performed while presenting a live (e.g., real-time) preview of the recording, with the user's face being represented by the selected avatar. Once the recording is completed, a second preview (e.g., a replay of the actual recording) will be presented, again using the selected avatar. However, at this stage, the user can scroll through avatar selection affordance 206 to select a new avatar to view the recording preview. In some cases, upon selection of a new avatar, the UI will begin to preview the recording using the selected avatar. The new preview can be presented with the audio/video effects or as originally recorded. As noted, the determination regarding whether to present the effected version or the original may be based at least in part on the last method of playback used. For example, if the last playback used effects, the first playback after a new avatar selection may use effects. However, if the last playback did not use effects, the first playback after a new avatar selection may not use effects. In some examples, the use can replay the avatar with effects by selecting effects preview affordance 208 or without effects by selecting original preview affordance 210. Once satisfied with the resultant avatar video and/or audio, the user can send the resultant video/audio in a message to another computing device using record/send video clip affordance 204. The video clip will be sent using the format corresponding to the last preview (e.g., with or without effects). At any time, if the user desires, delete affordance 212 may be selected to delete the avatar video and/or audio and either start over or exit the avatar and/or messaging applications.

Figure 3:
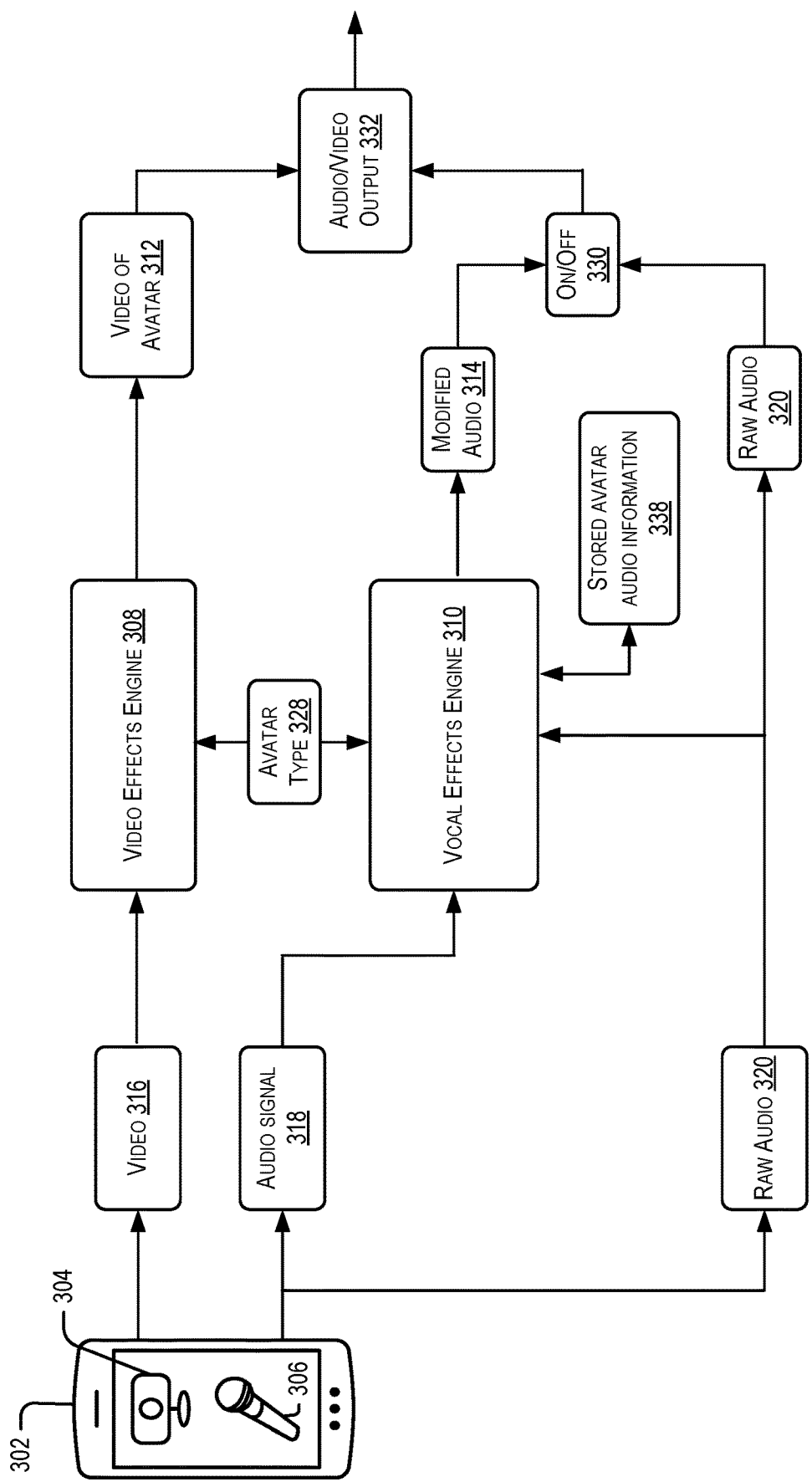
FIG. 3 is another simplified block diagram illustrating hardware and software components for providing audio and/or video effects techniques as described herein, according to at least one embodiment.

FIG. 3 is another simplified block diagram 300 illustrating hardware and software components for providing audio and/or video effects techniques as described herein, according to at least one embodiment. In some examples, more or less modules can be utilized to implement the providing of audio and/or video effects based at least in part on audio and/or video features extracted from a user's recording. In some examples, device 302 may be configured with camera 304, microphone 306, and a display screen for presenting a UI (e.g., the UI 200 of FIG. 2) and the avatar previews (e.g., the initial preview before recording as well as the preview of the recording before sending). Video effects engine 308 may be configured to manage the list of avatars, process the video features (e.g., facial feature characteristics), revise the video information, communicate with vocal effects engine 310 when appropriate, and render video of the avatar 312 when all video processing is complete and video effects have been implemented (or discarded). Revising of the video information can include adjusting or otherwise editing the metadata associated with the video file. In this way, when the video metadata (adjusted or not) is used to render the puppet, the facial features can be mapped to the puppet. In some examples, vocal effects engine 310 can store the audio signal and/or audio features, perform the logic for determining what effects to implement, compose new audio signals, revise an audio signal and/or audio features of the audio signal, and provide modified audio 314 (or a new audio signal) when all audio processing is complete and/or audio effects have been implemented (or discarded).

In some examples, once the user selects to record a new avatar clip, video 316 can be captured by camera 304 and/or audio signal 318 can be captured by microphone 306. In some cases there may be as many as (or more than) fifty facial features included within video 316. Example video features include, but are not limited to, duration of expressions, open mouth, frowns, smiles, eyebrows up or furrowed, etc. Additionally, video 316 may include metadata that identifies each of the facial features (e.g., data points that indicate which locations on the user's face moved or where in what position). The video effects engine 308 may be configured to extract video features from the video 316 and/or the video features 316 may be extracted by another system and provided to the video effects engine 308. Further, video 316 (and/or the extracted video features) can be provided to vocal effects engine 310. At video effects engine 308, the metadata and/or extracted features associated with video 316 can be stored and analyzed. At vocal effects engine 310, video features 316 may be compared with audio features 318 when it is helpful to match up what audio features correspond to which video features (e.g., to see if certain audio and video features occur at the same time).

In some examples, video effects engine 308 can make a determination as to what avatar has been selected. For example, the video effects engine 308 may determine the avatar type 328 (e.g., a robot, a cat, a dog, a dragon, a unicorn, etc.). Based at least in part on the avatar type 328, the video effects engine 308 may extract video metadata (or retrieve provided video metadata). The video effects engine 308 may be configured to adjust the video metadata according to the avatar type 328.

In some instances, audio signal 318 may be passed to vocal effects engine 310. The vocal effects engine 310 may be configured to extract audio features (e.g., a feature set) from the audio signal 318 and/or the feature set may be extracted by another system and provided to the vocal effects engine 310. Example audio features in a feature may include, but are not limited to, magnitude, pitch/frequency, phase (e.g., changes in volume, pitching, voicing, formants, duration, etc.), or any suitable audio characteristics of the audio signal. Raw audio 320 may include the unprocessed audio signal as it was captured. Raw audio 320 can be passed to vocal effects engine 310 for further processing and potential (e.g., eventual) revision and it can also be stored separately so that the original audio can be used if desired. As noted, in some examples, audio features may be extracted in real-time during a recording session, or in other examples, subsequent to completion of a recording session.

In some examples, vocal effects engine 310 can make a determination as to what avatar has been selected. For example, the vocal effects engine 310 may determine the avatar type 328 (e.g., a robot, a cat, a dog, a dragon, a unicorn, etc.). Based at least in part on the avatar type 328, the vocal effects engine 310 may retrieve stored avatar audio information 338. The stored avatar audio information 338 may include a feature set describing various audio characteristics of a voice associated with a particular avatar (e.g., the robot, the cat, the dog, the dragon, the unicorn, etc.) and/or an avatar audio signal associated with the particular avatar. In some embodiments, the avatar audio information 310 may include a set of rules for modifying audio signals provided by users to match (or substantially match) the audio signal and/or audio characteristics of the avatar. The vocal effects engine 310 may be configured to adjust the audio signal 318 according to the avatar audio information 338 and/or compose a new audio signal based at least in part on the audio signal 318 and, in some cases, the avatar audio information 338. By way of example, the vocal effects engine 310 may determine that for the selected avatar type 328, certain features of the audio signal 318 are to be adjusted and/or replaced. Many adjustments may be discussed in further detail in connection with FIGS. 4-8. However, for the purposes of illustration, a particular avatar type may indicate modifications to be made to a speech formant, a pitch, a phase, a magnitude, or any suitable modification that may be made to the audio signal 318 and/or features of the audio signal 318. In some examples, the user will be provided with an option to use the original audio file at on/off 330. If the user selects "off" (e.g., effects off), then raw audio 320 can be combined with video of avatar 312 (e.g., corresponding to unchanged video) to make A/V output 332. A/V output 332 can be provided to the avatar application presented on the UI of device 302. If the user selects "on" (e.g., effects on), then the modified audio 314 may be combined with the video of the avatar (e.g., corresponding to modified video) to generate the A/V output 332. In some embodiments where only audio effects are being performed such as examples in which no video is provided, the modified audio 314 may be provided as the output 332 without any video component.

Video effects engine 308 can be responsible for providing an initial avatar image based at least in part on the selection of avatar type 328. Additionally, video effects engine 308 may be responsible for mapping video features of the video 316 to the appropriate facial markers of each avatar. For example, if video features of video 316 indicate that the user is smiling, the metadata that indicates a smile can be mapped to the mouth area of the selected avatar so that the avatar appears to be smiling in video of avatar 312. Additionally, video effects engine 308 can receive timing changes from vocal effects engine 310, as appropriate. For example, if vocal effects engine 310 determines that voice effect is to make the audio be more of a whispering voice (e.g., based on avatar type 328 and the avatar audio information 338), and modifies the voice to be more of a whispered voice, this effect change may include slowing down the voice itself, in addition to a reduced level and other formant and/or pitch changes. Accordingly, the voice engine may produce a modified audio which is slower in playback speed relative to the original audio file for the audio clip. In this scenario, vocal effects engine 310 may then instruct video effects engine 308 via timing changes, so that the video file can be slowed down appropriately; otherwise, the video and audio may not be synchronized. As noted above, a user may use the avatar application of device 302 to select different types of avatars. In some examples, the modifications provided by the vocal effects engine 310 can change based at least in part on this selection. Similarly, selecting a different avatar type may cause the video effects engine 308 to modify the video 316 in a manner associated with the newly selected avatar type.

Figure 12:
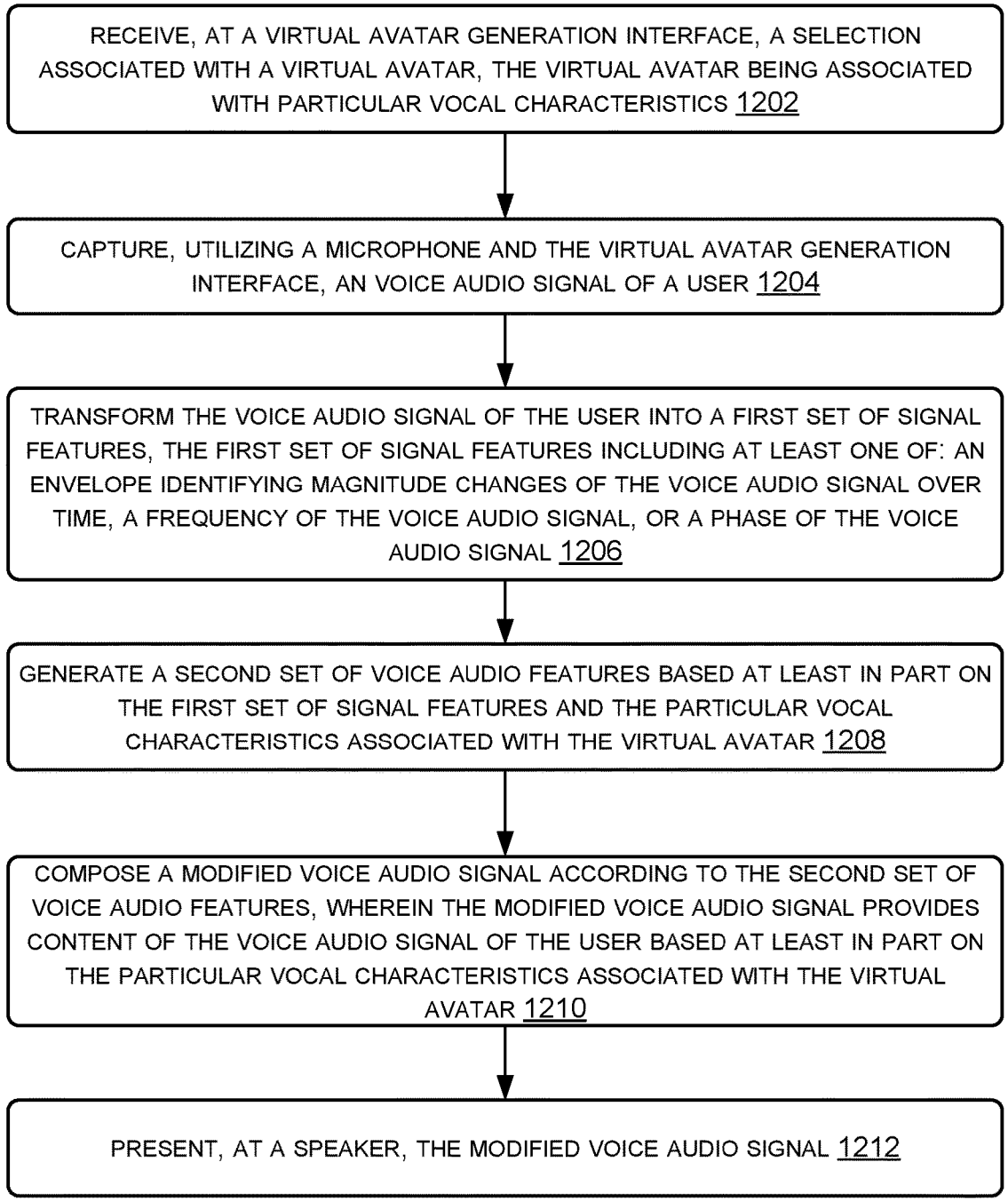
FIG. 12 is yet another flow diagram to illustrate another method for providing audio effects techniques as described herein, according to at least one embodiment.

In some examples, the video effects engine 308, the vocal effects engine 310, and/or another module of the avatar control module 1236 of FIG. 12 can be configured to package/render the avatar by combining video of avatar 312 and either modified audio 314 or raw audio 320 into audio/video (A/V) output 332. The A/V output 332 may be viewed via the UI 200 of FIG. 2 and heard via a speaker of the device 302. In some embodiments, an electronic message initiated within a messaging application of the device 302 can be transmitted to other computing devices, where the message includes A/V output 332.

As noted above, in some examples, video effects engine 308 may act as the feature extractor, in which case the video features of the video 316 may not exist prior to being sent to video effects engine 308. While not drawn this way in FIG. 3, parts of video effects engine 308 may actually exist within camera 304. Additionally, in some examples, metadata associated with video 316 can be stored in a secure container, and when vocal effects engine 310 is running, it can read the metadata from the container. Similarly, the vocal effects engine 308 may act as a feature extractor, in which case an audio features of the audio signal 318 may not exist prior to being sent to vocal effects engine 310. While not drawn this way in FIG. 3, parts of vocal effects engine 310 may actually exist as part of the microphone 306.

Figure 4:
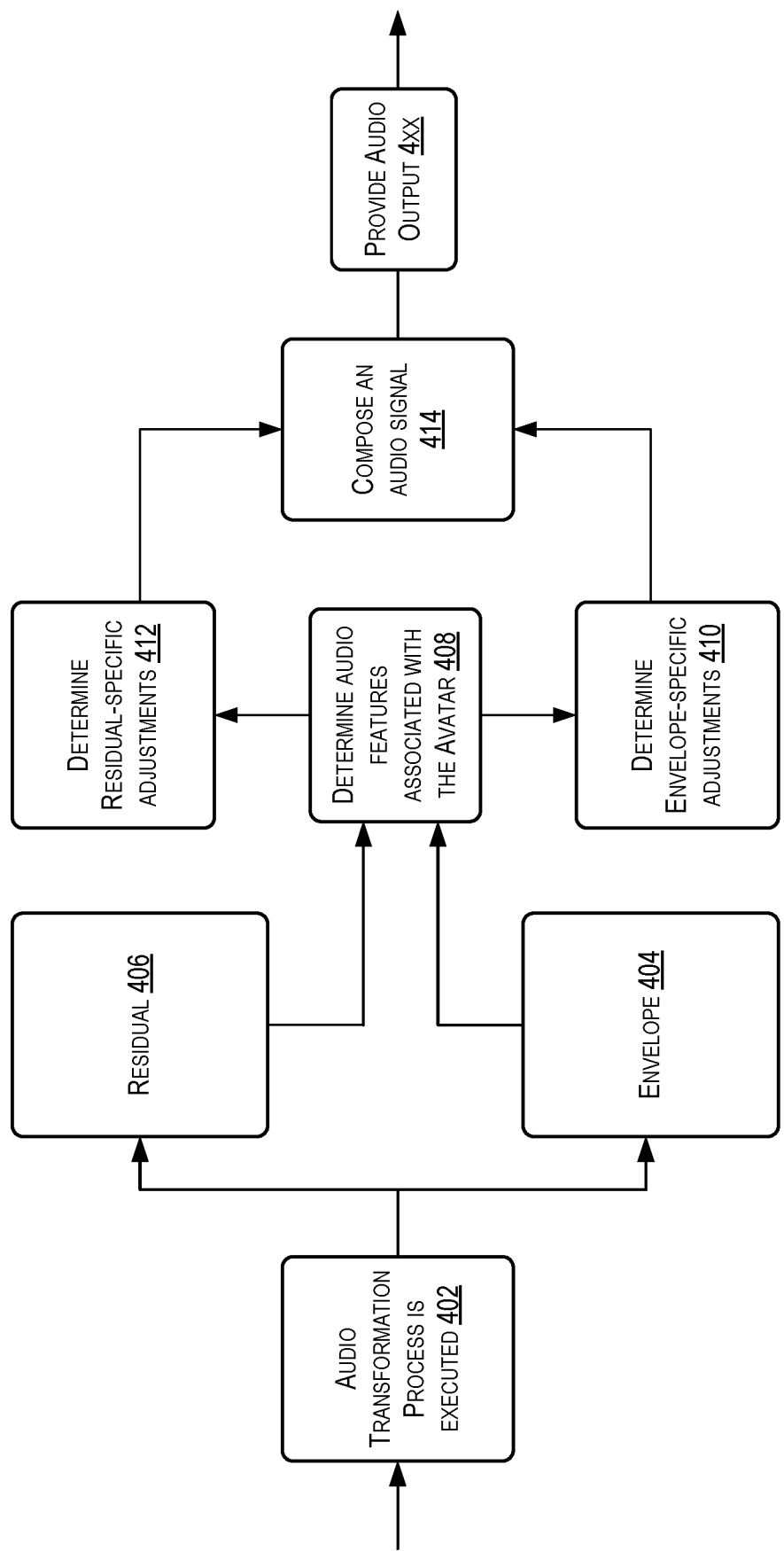
FIG. 4 is another simplified block diagram showing process for providing audio effects as described herein, according to at least one embodiment.

FIG. 4 is another simplified block diagram showing process 400 for providing audio effects as described herein, according to at least one embodiment. The process 400 may be performed by the vocal effects engine 310 of FIG. 3. The process 400 may begin at block 402 where an audio transformation process is executed. In some embodiments, the audio transformation process may include transforming the audio signal into a feature set utilizing a Short-Term Fourier Transform (STFT). In some embodiments, applying an STFT to an audio signal separates (or transforms) the audio signal into an envelope which defines the formant shape (e.g., corresponding to an envelope of the audio signal) and a fine-structure of the audio signal (e.g., corresponding to a residual of the audio signal). More specifically, a frame of time-domain input of the audio signal is transformed to a frame of STFT coefficients. Such STFT coefficients may overlap, where each STFT window of length L may span two or more time-domain input speech frames of length N. Each frame of STFT coefficients [X(1), . . . , X(L)] may be manipulated by first splitting the coefficients of each frame into two parts, including:

1) An envelope E=[E(1), . . . , E(L)], where E(k) is a real and positive number for all k; and
2) A residual R=[R(1), . . . , R(L)] where X(k)=E(k)R(k) and R(k) is generally a complex number.

Figure 5:
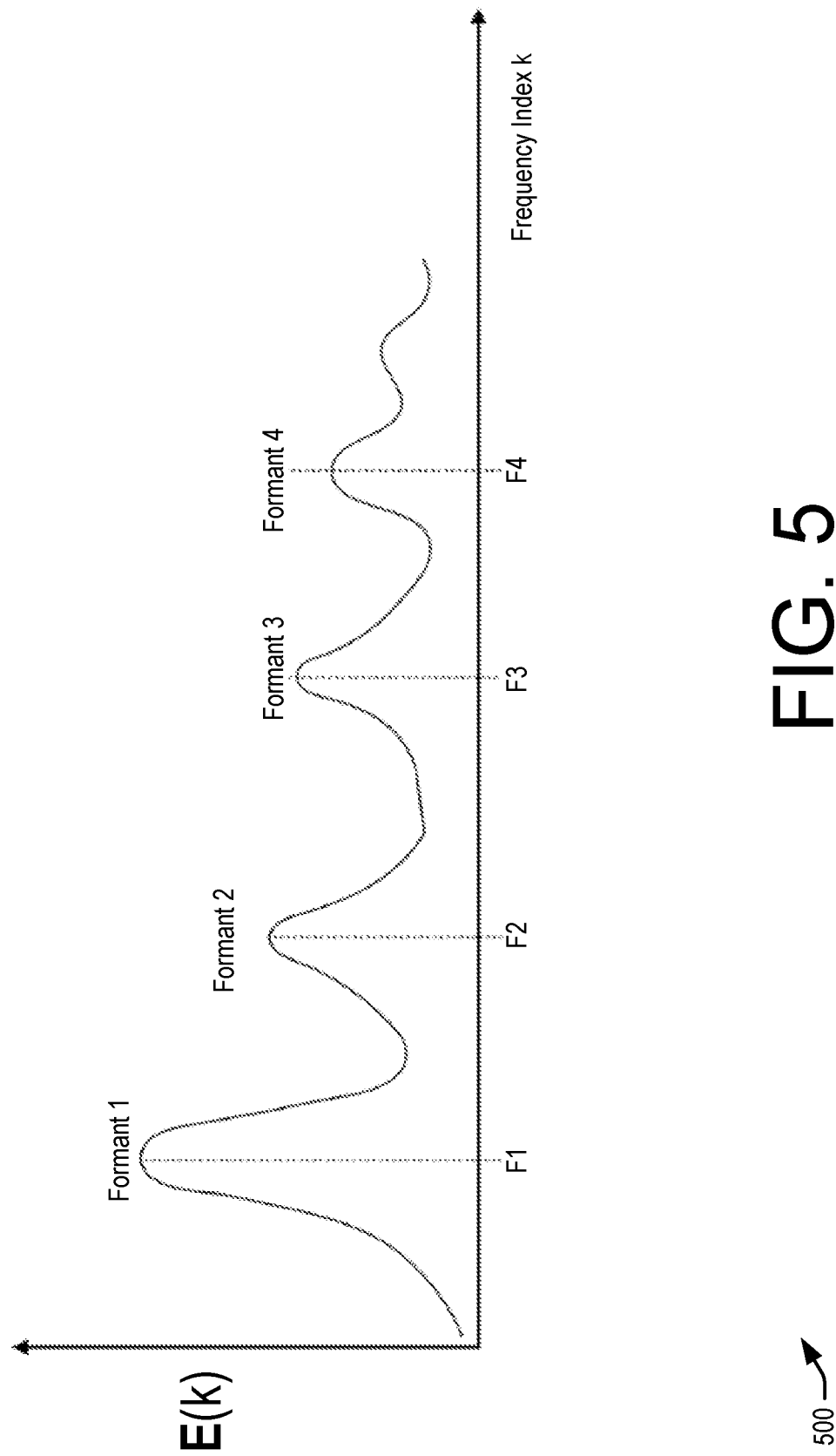
FIG. 5 illustrates an example envelope associated with an audio signal, according to at least one embodiment.

The envelope E may represent a speech-relevant shape structure that includes one or more formants of the audio signal. A graphical representation 500 of an envelope is provided in FIG. 5. As depicted in FIG. 5, formant 1 may be identified within envelope E at frequency index F1, formant 2 may be identified within envelope E at frequency index F2, formant 3 may be identified within envelope E at frequency index F3, and formant 4 may be identified within envelope E at frequency index F4. The formants of FIG. 5 may represent spectral peaks of the sound spectrum, or said another way, the formants of FIG. 5 may represent harmonic notes of the audio signal that are augmented by a resonance.

Returning to FIG. 4, the residual R (e.g., determined by a STFT application to the voice audio signal) may include the remaining structure which includes correlations that go beyond the modeling capacity used to define the envelope E. This may include finer information such as pitch, which may be embedded in the phase of the complex coefficients [R(1), . . . , R(L)]. In some examples, each coefficient R(k) may have a magnitude |R(k)| and a phase "ang(R(k))" such that:

$R(k)=|R(k)|\exp(i \times ang(R(k)))$, where $i=\mathrm{sqrt}(-1)$

Accordingly, by applying an STFT to an audio signal (e.g., the audio signal 318 of FIG. 3), a feature set including an envelope 404 and a residual 406 may be generated.

At block 408, audio features associated with an avatar may be determined. For example, given the type of avatar selected by the user, a particular audio signal, audio feature set, and/or rules/logic previously associated with the avatar type may be retrieved from storage. The audio features of the avatar may be previously extracted/provided and stored for later retrieval. In some embodiments, an audio signal of the avatar may be stored and the audio features of the avatar may be extracted from this stored audio signal. In still further examples, a set of rules and/or logic may be stored and associated with the avatar. By utilizing the audio features (stored and/or extracted features and/or rules/logic) associated with the avatar, various adjustments may be made to the audio signal. Some of these modifications may be described in further detail below with respect to FIGS. 7-9.

At block 410, envelope-specific adjustments may be determined. For example, audio features and/or rules and/or logic associated with the avatar may be utilized to determine particular adjustments to be made to the envelope 404. Thus, for different users the particular adjustments may differ. In some embodiments, the envelope 404 may be compared to an envelope associated with the avatar (and included as an audio feature of the avatar) in order to determine differences between the envelope 404 and the envelope of the avatar. In some embodiments, the envelope 404 may be adjusted to more closely resemble the envelope of the avatar. By way of example only, one or more formants of the envelope 404 may be shifted, widened, or otherwise modified to more closely match the envelope of the avatar. As another example, a set of rules and/or logic may dictate that, for a particular avatar, particular formant modifications are to be made to the envelope 404. For example, an avatar may have target center-frequency ranges and formant-bandwidths for each formant. A user may have a prevailing distribution of such values in the recorded speech. The transformation can then take a user's speech and through formant shifts and formant-bandwidth modifications make the resulting distribution of such values closer and/or conforming to the avatar's target values. In this way, too, different users will have different voices for a given avatar.

At block 412, residual-specific adjustments may be determined. For example, audio features and/or rules and/or logic associated with the avatar may be utilized to determine particular adjustments to be made to the residual 406. In some embodiments, the residual 406 (parameters and/or coefficients of the residual 406) may be compared to a residual feature set associated with the avatar in order to determine differences between the residual 406 and the residual feature set of the avatar. In some embodiments, any suitable parameter and/or coefficient of the residual 406 may be adjusted to more closely resemble the residual feature set of the avatar. By way of example only, the phase and/or frequency and/or magnitude of the residual 406 may be modified (or replaced) to more closely match the residual coefficients associated with the avatar. As another example, a set of rules and/or logic may dictate that, for a particular avatar, particular modifications are to be made to the residual 406.

As a specific example, the audio features associated with an avatar (e.g., a robot avatar) may include a saw-tooth wave of fixed frequency. In some embodiments, the phase of the residual 406 may be modified and/or replaced with phase coefficients corresponding to the saw-tooth wave. Said another way, an audio signal that provides a robotic type voice may be associated with a robot avatar. Transforming the robot's audio signal into various coefficients may be performed by applying a Short-Term Fourier Transform to the audio signal associated with the robot avatar. These coefficients may be expressed by C=[C(1), . . . , C(L)]. Each coefficient C(k) may include a magnitude |C(k)| and a phase "ang(C(k))" such that C(k)=|C(k)|exp(i×ang(C(k))). In some embodiments, each phase of R(k) (a phase of the user's audio signal) may be replaced with a phase C(k) (e.g., a phase of the audio signal associated with the robot avatar). This may be expressed by the following formula:

$R_{new}=[R_{new}(1), \ldots, R_{new}(L)]$ where $R_{new}(k)=|R(k)| \exp(i \times ang(C(k)))$ to form:

$X_{new}=[X_{new}(1), \ldots, X_{new}(L)]$ by $X_{new}(k)=E(k)R_{new}(k)$

The inverse STFT of $X_{new}$ may then create time-domain samples of a pitch modified speech.

In some embodiments, the rules for modifying an audio signal of a user may be predefined and/or the rules for modifying an audio signal of a user may be learned using machine-learning techniques and historic adjustments that have been made in the past. If machine-learning techniques are used, a model may be trained using historic adjustments that have been made to various user's audio inputs in order to match, or substantially match, an audio signal associated with a particular avatar. In some embodiments, the model may be trained using simultaneous speech examples. By way of example, the model may be trained using training data that includes various user's speaking the same words and/or phrases as a target voice. By training such a model based on, for example, supervised machine learning techniques, the model may be configured to identify particular adjustments to be made (e.g., to an envelope and/or to a residual) in order to modify an audio signal to substantially match the avatar's audio signal. Thus, a machine-learning model may be provided the user's audio signal as input, and may identify the necessary changes to be made in order to adjust the audio signal and/or to compose a new audio signal that will present the user's voice as substantially matching the voice associated with the selected avatar.

As a non-limiting examples, a target voice may be provided by a voice actor. The target voice may be a widely-known character such as a beloved children's cartoon character. The voice actor may provide a phrase in the character's voice. Vocal samples may be collected from a variety of users. These users may provide the same phrase as the character actor but in their natural voice. In some embodiments, the machine-learning model may be trained to modify the collected vocal samples to more closely resemble the character's voice. In other embodiments, the machine-learning model may be trained to convert the vocal samples to substantially match the character's voice. Once trained, the machine-learning model may be used to determine particular modifications (e.g., modifications to the envelope and/or residual) to modify an input voice audio signal to sound more like, or substantially identical to, the target voice (e.g., the voice of the cartoon character).

At block 414, an audio signal may be composed from the residual 406 (modified or unmodified) and the envelope 404 (modified or unmodified). For example, a particular avatar may be associated with modifications to envelope 404 and no modifications to residual 406. Another avatar may be associated with modification to be made to the envelope 404 and the residual 406. Yet another avatar may be associated with modifications to be made to the residual 406 alone. Accordingly, an audio signal may be composed which includes the modified/unmodified residual 406 and the modified/unmodified envelope 404. In some embodiments, audio output may be composed by combining the modified/unmodified version of envelope 404 and the modified/unmodified version of residual 406 and applying an inverse STFT to transform the modified/unmodified version of envelope 404 and the modified/unmodified version of residual 406 into a resultant audio signal (e.g., audio output).

At block 416, audio output corresponding to the composed audio signal may be provided. The composed audio signal may correspond to the modified audio 314 discussed above in connection with FIG. 3. Thus, utilizing the process 400, an audio signal of a user may be modified, or used to compose, an audio signal that more closely matches (or substantially matches) an audio signal (or feature set) associated with an avatar.

Figure 6:
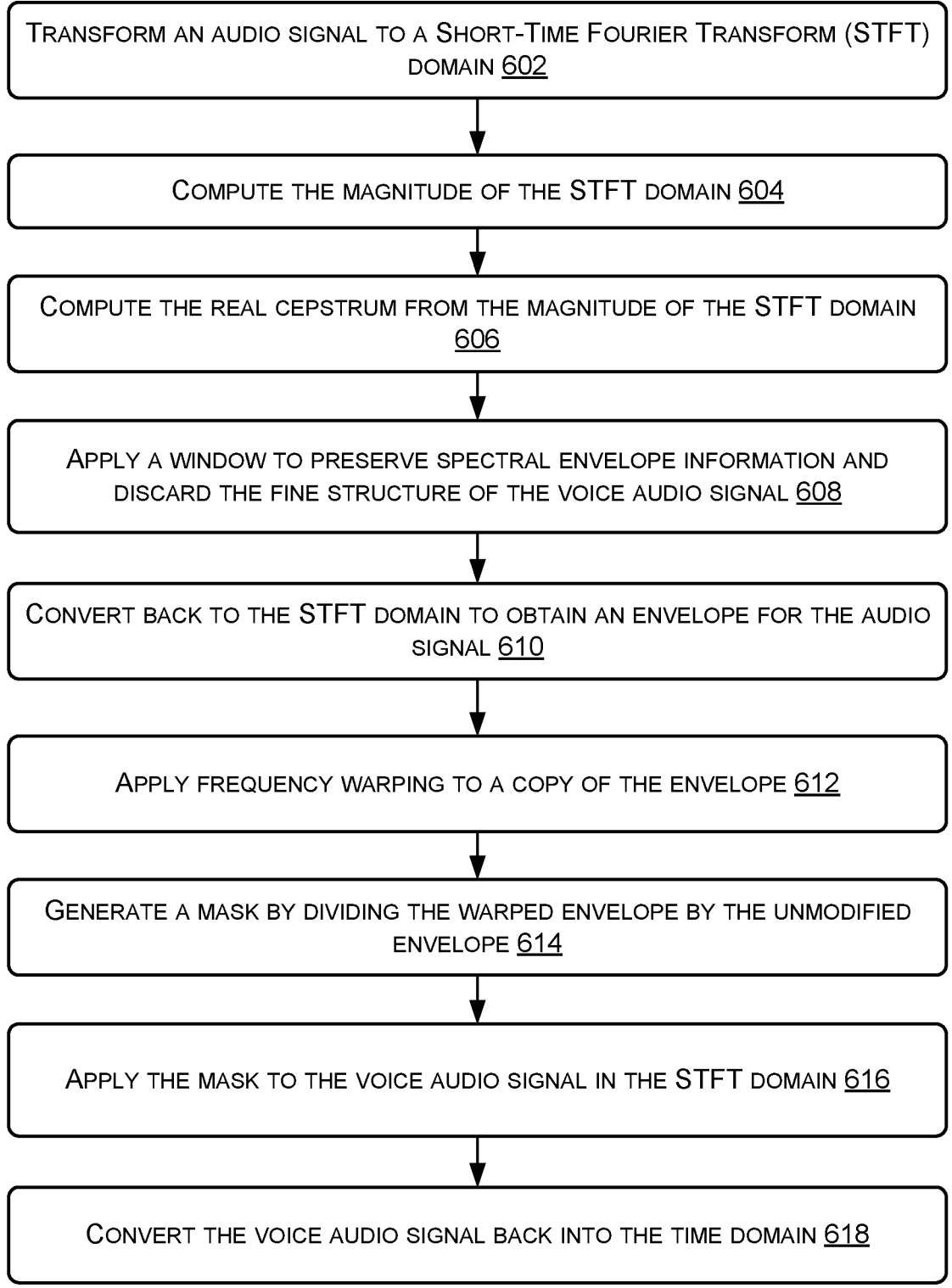
FIG. 6 is a flow diagram illustrating an example of an envelope modification algorithm, according to at least one embodiment.

In some embodiments, an envelope modification algorithm may be utilized to modify an envelope of a voice audio signal. FIG. 6 is a flow diagram illustrating an example of an envelope modification algorithm 600, according to at least one embodiment. The operations of the envelope modification algorithm 600 may be performed the vocal effects engine 310 of FIG. 3.

The envelope modification algorithm 600 may begin at 602, where the voice audio signal may be transformed to a Short-Term Fourier Transform (STFT) domain. To transform the voice audio signal into a STFT domain, a STFT may be applied to the voice audio signal to separate (or transform) the voice audio signal into an envelope which defines the formant shape (e.g., corresponding to an envelope of the voice audio signal) and a fine-structure of the voice audio signal (e.g., corresponding to a residual of the voice audio signal).

At 604, the magnitude of the STFT domain may be computed. Once computed, the magnitude of the STFT domain may be used to compute the real cepstrum of the voice audio signal at 606. A real cepstrum is a homomorphic transformation that transforms the voice audio signal from a convolution of two original signals into a sum of the two signals. In some embodiments, the real cepstrum is defined as the inverse Fourier Transform of the logarithm of the magnitude of the signal.

At 608, a window function (e.g., a Hann window, a Hamming window) may be applied to preserve/isolate the spectral envelope information which corresponds to the low quefrencies, and to discard the fine structure of the voice audio signal which corresponds to the high quefrencies. A quefrency is the independent variable of a cepstral graph that is a measure of time, though not in the sense of an audio signal in the time domain. A window function may be a mathematical function that is zero-valued outside of some chosen interval. In some embodiments, the window has non-zero values at lower quefrencies (below the minimum pitch quefrency) and zero otherwise.

At 610, the envelope of the voice audio signal (e.g., the envelope determined at 608) may be converted back to the STFT domain by taking the exponential of the inverse Fourier transform of the windowed real cepstrum. At 612, frequency warping (or another modification) may be applied to a copy of the envelope. "Frequency warping" is a transformative process in which one spectral representation on a certain frequency scale with a certain frequency resolution is transformed to another representation on a new frequency scale.

At 614, a multiplicative mask may be generated by dividing the warped envelope by the unmodified envelope. The multiplicative mask may define the modifications. The mask can be further smoothed and limited in magnitude to avoid or mitigate reconstruction artifacts. Once the mask is generated, it may be applied to the voice audio signal in the STFT domain by multiplication at 616 to modify the voice audio signal in the STFT domain.

Once the STFT is modified using the mask, the voice audio signal may be converted back into the time domain at 618. By way of example, an inverse STFT may be applied to the signal in the STFT domain to convert the signal back into the time domain.

One advantage of utilizing a mask approach as described in FIG. 6 is that a mask can provide insights into the properties and effects that the modification will have on the signal. For example, if the mask has very large values (e.g. division by a very small number), it is possible that the reconstructed waveform will exceed the headroom and clipping may occur, or noise could be amplified, etc. As another example, if the mask prescribes a step function (abrupt changes across either frequency or time), the modification may not be realistically implemented and may result in artifacts (e.g. aliasing). These examples indicate that a mask can be conveniently manipulated (e.g. though magnitude limitation, spectro-temporal smoothing, etc.) to avoid or diminish the undesired effects.

The examples provided in FIG. 4 and FIG. 6 are illustrative of multiple ways in which an envelope (and in the case of FIG. 4, a residual) may be modified. It should be appreciated that any modification of an envelope discussed herein may be performed by directly manipulating the envelope as discussed in FIG. 4, by generating a mask which defines a modification and then applying the mask as described in FIG. 6, or a combination of the two. By way of example of a combined approach, an initial direct manipulation of the envelope "E" and the residual "R" may be made, illustrated by $X_{new}=E_{new}*R_{new}$, where $E_{new}$ is a new real-valued envelope and $R_{new}$ is a new complex-valued residual. Based on this initial direct manipulation, a mask may be calculated (e.g., $M_{initial}=E_{new}/E$). $M_{initial}$ may be can be further smoothed and limited in magnitude to avoid or mitigate reconstruction artifacts to generate $M_{final}$. Thus, the application of $M_{final}$ may provide $E_{new}$ (e.g., $E_{new}=M_{final}*E$). In this manner, direct manipulation of an envelope may be combined with masking an envelope in order to provide the appropriate modifications. Although some examples herein may describe direct manipulation of an envelope to provide modifications to an envelope, it should be appreciated that those same examples may be alternatively performed by generating and applying a mask as described in FIG. 4, or through a combination of direct manipulation and masking as described above.

Figure 7:
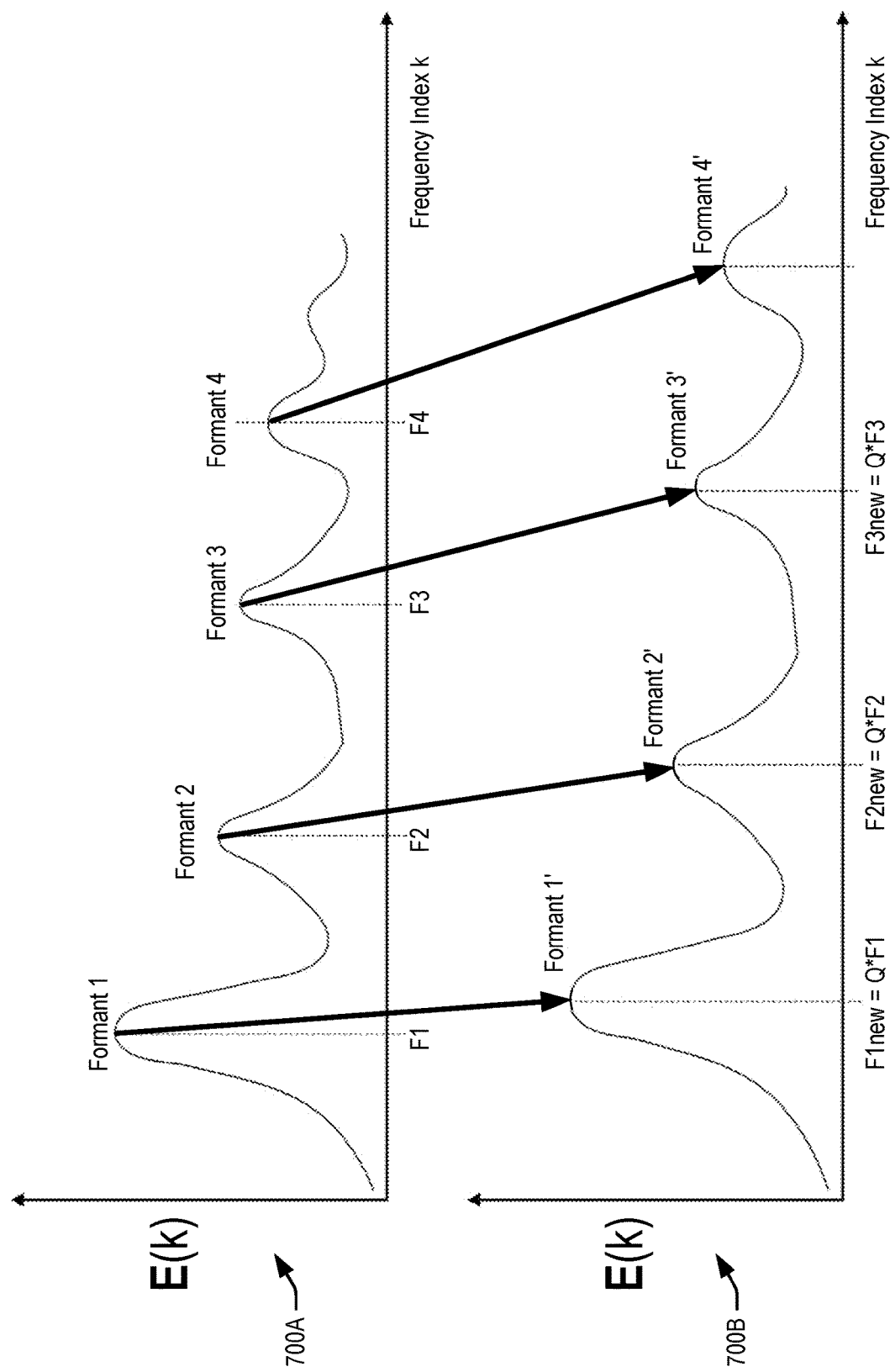
FIG. 7 illustrates an example modification of an envelope associated with an audio signal, according to at least one embodiment.
Figure 8:
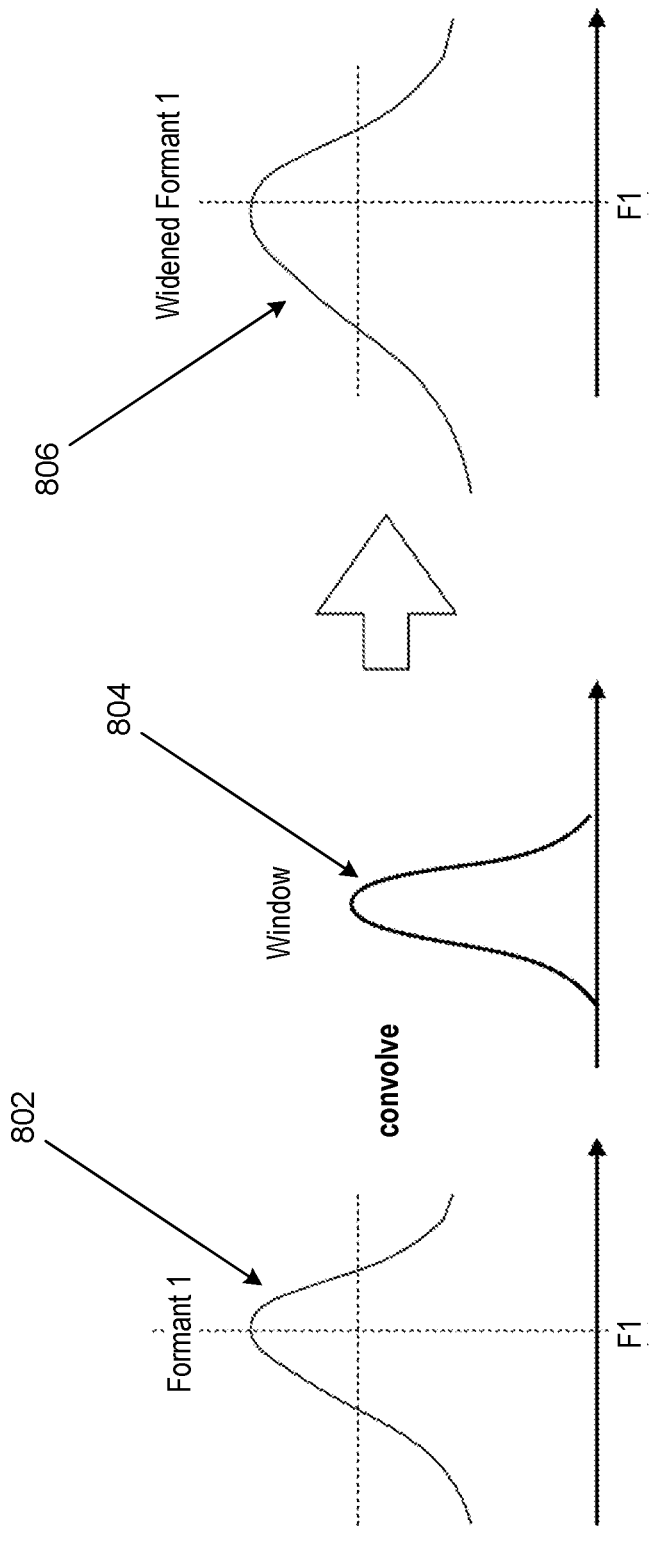
FIG. 8 illustrates another example modification of an envelope associated with an audio signal, according to at least one embodiment.
Figure 9:
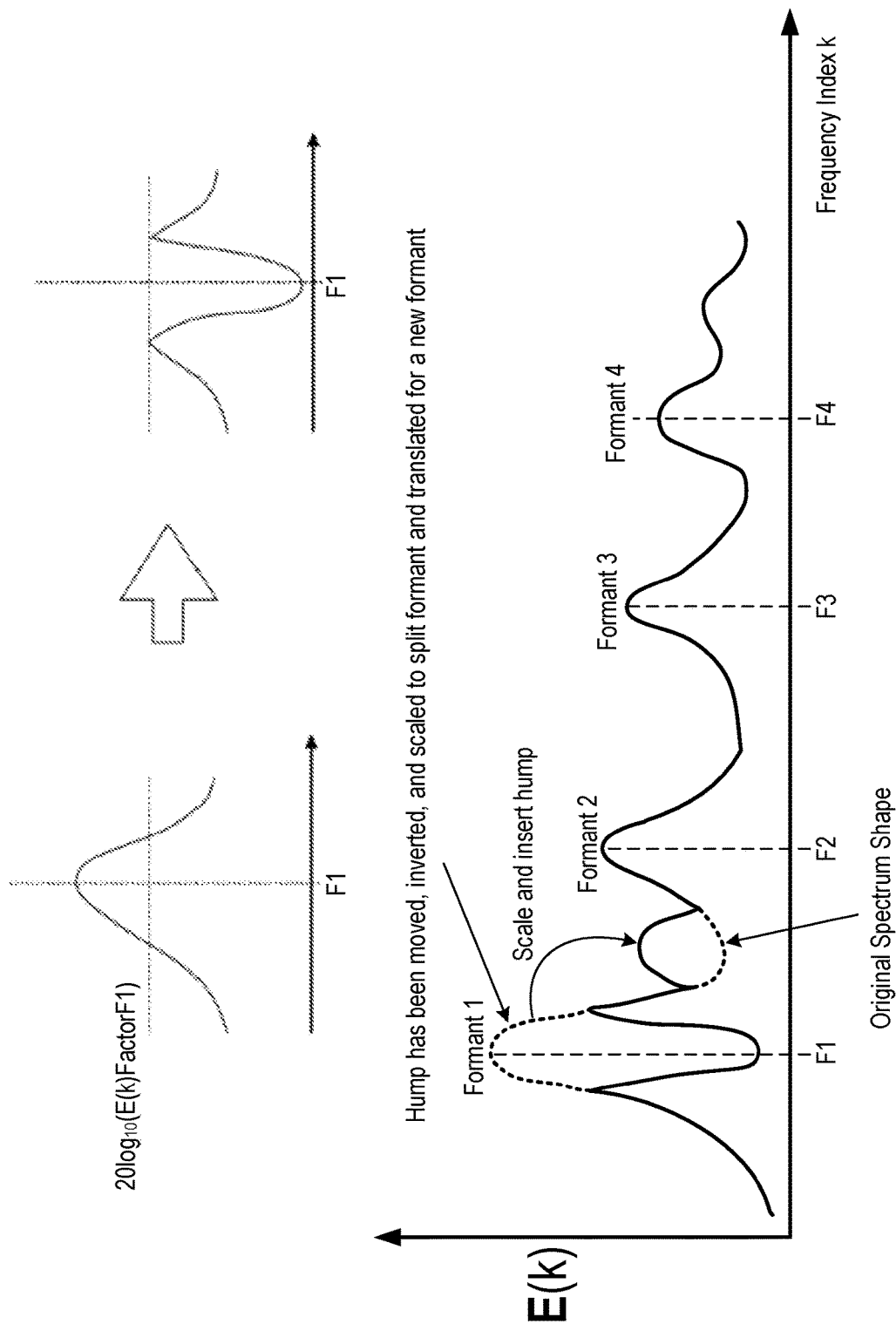
FIG. 9 illustrates yet another example modification of an envelope associated with an audio signal, according to at least one embodiment.

FIGS. 7-9 each illustrates an example modification of an envelope associated with an audio signal, according to at least one embodiment. FIG. 7, for example, illustrates a modification to an envelope (e.g., the envelope 500 of FIG. 5) in which one or more formants are shifted. The original envelope E is graphically depicted at 700A, while the modified envelope with the shifted formants is depicted at 700B. Formant shifting may cause a vocal effect in which the timbre of the audio signal is modified (e.g., the voice is deepened and sounds lower), but, in some cases, not the actual pitch of the audio signal. The formant shifts depicted in FIG. 7 may be predefined (e.g., formants should each shift to the left and/or right by a predetermined amount or the formants should each shift according to a predetermined algorithm).

In some embodiments, the formant shifts depicted in FIG. 7 may be determined utilizing a machine-learning algorithm. By way of example, a model may be trained on historic modifications made to users voices to modify the users' respective voices to match (or substantially match) the vocal characteristics of an avatar. In some embodiments, a target voice and the input voices may utter the same word(s) and/or phrase(s). Thus, the particular formant shifts illustrated in FIG. 7 may be determined by inputting an audio signal provided by a user (e.g., the user 104 of FIG. 1) into the machine-learning algorithm which may then output formant-specific modifications to be made. These modifications may then be applied (e.g., by the vocal effects engine 310 of FIG. 3) in order to shift the formants of the audio signal provided by the user.

In some embodiments, the frequency axis of the envelope E may be warped. Said another way, the frequency index k may be multiplied by a factor of Q (e.g., 0.5, 2, etc.). In some embodiments, a multiplier that is less than 1.0 may contract a formant (e.g., shift the formants of FIG. 7 to the left), while a multiplier greater than 1.0 may expand the formant (e.g., shift the formants of FIG. 7 to the right). Thus, FIG. 7 may depict a shifting of formants when Q>1.0.

In some embodiments, formant shifting similar to that depicted in FIG. 7 may be combined with phase adjustments made to the residual 406 of FIG. 4. For example, a voice associated with an alien avatar could be generated from a user's audio signal by shifting the formants as described in FIG. 7 as well as adjusting phase of the audio signal. In some examples, the phase of the user's audio signal may be adjusted based at least in part on a saw-wave audio signal pattern associated with the alien avatar.

FIG. 8 illustrates a modification to an envelope (e.g., the envelope 500 of FIG. 5) in which one or more formants are widened. In the example depicted, formant 1 of the envelope 404 may be manipulated via a bandwidth expansion. By way of example, the formant 1 (e.g., of the original envelope 500) may be convolved with a window (e.g., a Hann or Hamming window). Hann or Hamming windows may be mathematical functions in which zero-values occur outside some predetermined interval. Hann and/or Hamming windows may be used to reduce spectral leakage in Fourier transforms. By convolving a formant 802 (e.g., the formant 1 of FIG. 5) with a window 804 (e.g., a Hamming window) a widened formant 1 may be generated as depicted at 806.

FIG. 9 illustrates another modification to an envelope (e.g., the envelope 500 of FIG. 5). The modifications to the envelope as depicted in FIG. 9 may result in an audio signal that includes a nasal effect. The nasal effect may be primarily created through of the envelope 500, though pitch shifting (phase modification of R) can also help. Although not depicted, pitch shifting may increase pitch by a multiplying the pitch by a factor of z. Thus, to simulate a nasal sounding avatar formants may be widened, new formants created, etc.

As a non-limiting example, the formants of envelope 500 may be widened by convolving envelope 500 with a narrow hamming window. This may not change F1 or F2. Rather, convolving the envelope 500 with the narrow hamming window may widen the width of one or more formants. Formant points (e.g., points at F1 and F2) may be identified by searching for peaks in the spectrum are at least as wide as a minimum threshold width.

In some embodiments, a formant bandwidth of the first formant may be determined. The first formant (e.g., formant 1) may be defined as the span of index values around F1 for which E(k) exceeds a threshold value. This may be expressed as $E(F1) \times FactorF1$, where FactorF1<1.0. For example, FactorF1 may equal 0.25. This may be referred to as "BWF1." Similarly, a formant bandwidth of the second formant may be determined. The second formant (e.g., formant 2) may be defined as the span of index values around F2 for which E(k) exceeds a threshold. This may be expressed as $E(F1) \times FactorF2$, where FactorF1<1.0. This may be referred to as "BWF2."

In some embodiments, envelope 500 may be manipulated in the log domain using the log envelope defined as $EdB=[EdB(1), \ldots, EdB(L)]$ by $EdB(k)=20_{log} 10(E(k))$. If BWF1 exceeds a minimum value, e.g. the equivalent of 100 Hz, the first formant may be split by taking the "hump" of the formant around the center F1 for which E(k) exceeds a threshold $E(F1) \times FactorF1$. In the log domain this hump may be inverted and scaled by a multiplicative factor which deepens the valley. This essentially splits the first formant as if a zero in the spectrum was inserted near F1.

In some embodiments, if the distance between F1 and F2 exceeds a minimum, (e.g. the equivalent of 500 Hz), then a new resonance may be inserted between the two formants (e.g., Formant 1 and Formant 2). For example, the original shape of the (non-inverted) removed hump may be scaled and added between Formant 1 and Formant 2. When the resultant envelope is utilized to compose an audio signal (e.g., using an inverse STFT), the resultant audio signal may include nasal-sounding effects.

It should be appreciated that FIGS. 7-9 are merely some of the various examples in which an envelope may be modified. It is contemplated that various kinds of envelope and/or residual adjustments made be made to adjust/produce an audio signal to simulate the vocal characteristics associated with an avatar. As yet another example, a user's audio signal may be modified to produce a whisper effect that is associated with a particular avatar. To produce the whisper effect, the envelope 500 may be stretched by a factor Q>1.0 (e.g., Q=1.1). This may give us a modified envelope E1. E1 may then be bandwidth expanded (e.g., utilizing a Hann or Hamming window as described above in connection with FIG. 8) to produce E2. In some embodiments, a Hann window with a window length of 600 to 1000 Hz may be utilized, which may result in a relatively extreme widening of the formants of E1.

In some embodiments, a relative envelope may be calculated. $E_{relative}$=E2/E1 wherein the maximum value is limited (e.g., to 1.0). Thus, $E_{relative}$=[$E_{relative}$(1), . . . , $E_{relative}$(L)] with $E_{relative}$(k)<=1.0. The phase of residual R may be randomized to give $R_{new}$.

In some embodiments, the frequency axis between F1 and F2 may be divided into 2 regions. The first formant bandwidth may be calculated as described above with respect to the nasal effect and a frequency range may be determined (e.g., [$F1_{lower}$, $F1_{upper}$]). Similarly, a second formant bandwidth may be calculated for F2 and a second frequency range may be determined for the second formant [$F2_{lower}$, $F2_{upper}$]. Two middle points may be determined between F1 and F2 such that $F_{mid}1$=min($F1_{upper}$, $F2_{lower}$) and $F_{mid}2$=max($F1_{upper}$, $F2_{lower}$). $F_{mid}2$ may then be greater or equal to $F_{mid}1$.

In some embodiments, the frequencies of $E_{relative}$(k) may be adjusted to form a new envelope $E_{relnew}$ such that if the $E_{relnew}$ was applied to the original envelope E, the new magnitudes would be strictly less than E(F2) and all magnitudes would be decreasing with decreasing k. This can be described mathematically as an interactive process where the modification at index k motes what the modification at index k+1 produced. From frequency index k=$F_{mid}1$ down to k=1 we progressively drive $E_{relative}$(k) down. Finally, the relative spectrum $E_{relnew}$ may be smoothed to suppress low frequencies while amplifying the high frequencies, similar to a "Treble" boost. An inverse STFT may be calculated for $E_{relnew}$ to calculate a new time domain of modified speech (e.g., to compose audio output that presents the original audio signal as a whispered version that matches, or substantially matches, the audio characteristics associated with the avatar).

Figure 10:
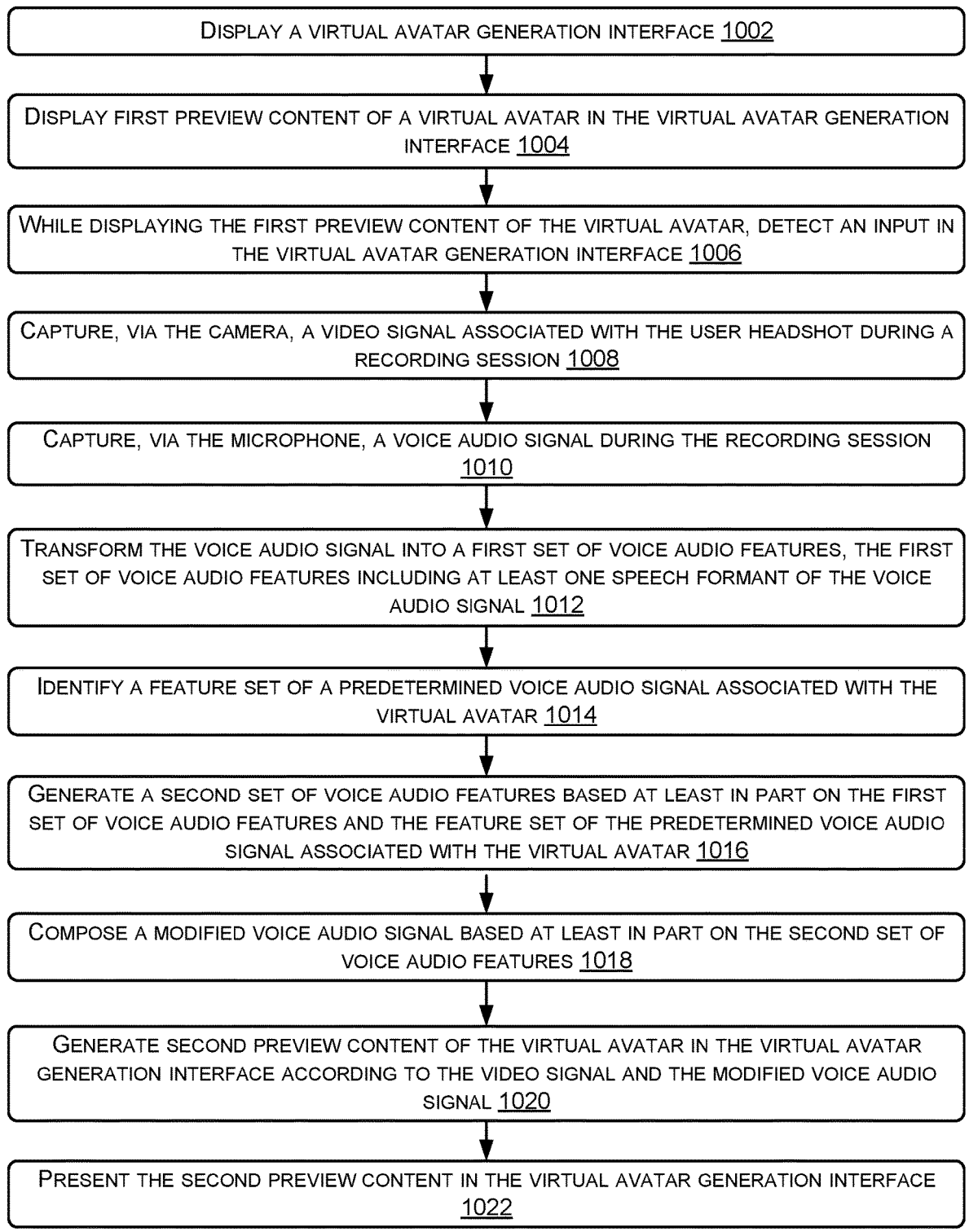
FIG. 10 is a flow diagram to illustrate a method for providing audio and video effects techniques as described herein, according to at least one embodiment.

FIG. 10 is a flow diagram to illustrate a method 10000 providing audio and video effects techniques as described herein, according to at least one embodiment. Method 900 may be performed at an electronic device having at least a camera and a microphone. The operations of method 1000 may be performed in any suitable order. Additional operations may be included, or at least one of the operations of method 1000 may be excluded in some embodiments.

The method 1000 may begin at block 1002, where a virtual avatar generation interface (e.g., the virtual avatar generation interface 200) may be displayed. In some embodiments, the interface may be provided by the video effects engine 1342, the vocal effects engine 1344, or the avatar application module 1338 of FIG. 13.

At block 1004, first preview content of a virtual avatar may be displayed (e.g., by the video effects engine 1342) in the virtual avatar generation interface. In some embodiments, the first preview content of the virtual avatar may correspond to real-time preview video frames of a user headshot in a field of view of the camera and associated headshot changes in an appearance.

At block 1006, while displaying the first preview content of the virtual avatar, an input may be detected in the virtual avatar generation interface. In at least one embodiment, the input may correspond a selection of the record/send video clip option 204. In some embodiments, the input may additionally, or alternatively correspond to a selection of a virtual avatar type (e.g., a dog, a cat, a dragon, a pig, etc.)

At block 1008, in response to detecting the input in the virtual avatar generation interface, a video signal associated with the user headshot may be captured with the camera during a recording session.

At block 1010, in response to detecting the input in the virtual avatar generation interface, a voice audio signal may be captured with the microphone during the recording session.

At block 1012, in response to detecting expiration of the recording session, the voice audio signal may be transformed (e.g., by the vocal effects engine 1344, an example of the vocal effects engine 112 of FIG. 1) into a first set of voice audio features. In some embodiments, the first set of voice audio features may include at least one speech formant of the voice audio signal.

At block 1014, in response to detecting expiration of the recording session, a feature set of a predetermined voice audio signal associated with the virtual avatar may be determined (e.g., by the vocal effects engine 1344). The feature set may include an envelope and/or a fine structure of the voice audio signal. In some embodiments, the feature set may be determined utilizing a Short-Term Fourier Transform.

At block 1016, in response to detecting expiration of the recording session, a second set of voice audio features may be generated based at least in part on the first set of voice audio features and the feature set of the predetermined voice audio signal associated with the virtual avatar. In some embodiments, the second set of voice audio features may include a modified version of the at least one speech formant of the voice audio signal.

At block 1018, in response to detecting expiration of the recording session, a modified voice audio signal may be composed (e.g., by the vocal effects engine 1344) based at least in part on the second set of voice audio features. In some embodiments, the voice audio signal may be composed by modifying the first set of voice audio features, by replacing at least one of the first set of voice audio features, or the like. Composing the modified voice audio signal may further include utilizing an inverse Short-Term Fourier Transform.

By way of example, a robot avatar may be associated with a predetermined voice audio signal that includes a robotic voice. Accordingly, particular modifications may be made to the voice audio signal to compose a modified version of the voice audio signal which more closely (or substantially matches) the predetermined voice audio signal associated with the robot. As a non-limiting example, the phase coefficients of the first set of voice audio features may be replaced, as described above, with phase coefficients of the predetermined voice audio signal associated with the robot avatar. This is just one example. Each type of virtual avatar (e.g., a dog, a cat, a pig, a dragon, a robot, an alien, or the like) may individually be associated with a particular predetermined voice audio signal. A cat may be a relatively high-pitched audio signal that utilized a whisper voice. A pig may be associated with a nasal-sounding voice. A dragon may be associated with a deep voice which of high magnitude. An alien voice may be associated with a voice that corresponds to a saw-wave as described above. These are just a number of examples, it should be appreciated that more or fewer, and potentially different types of avatars are contemplated, each being associated with a particular predetermined voice audio signal (or set of voice audio features) which are unique to the avatar type.

At block 1020, second preview content of the virtual avatar may be generated (e.g., by the video effect engine 1342) in the virtual avatar generation interface according to the video signal and the modified voice audio signal.

At block 1022, the second preview content may be presented in the virtual avatar generation interface.

Figure 11:
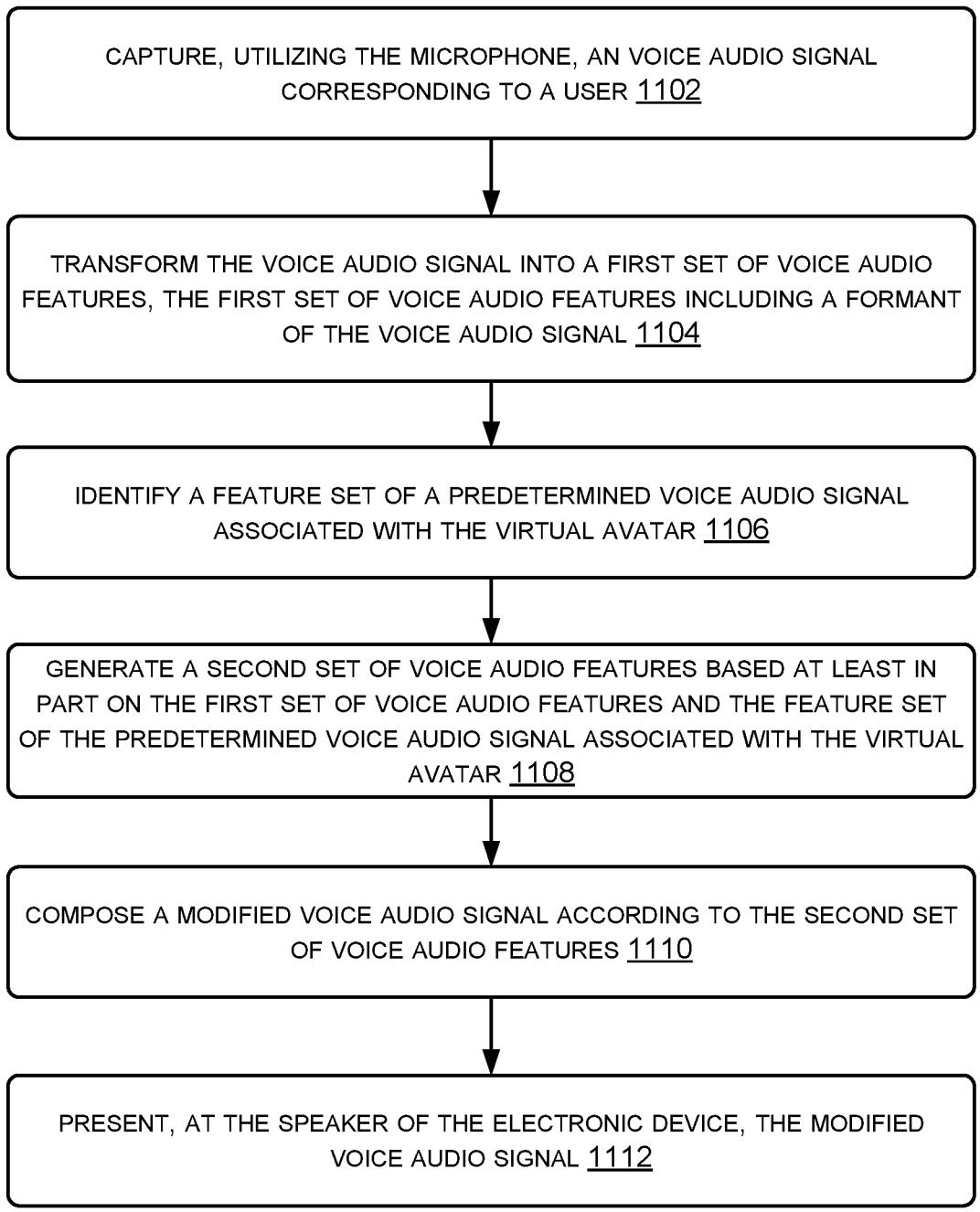
FIG. 11 is another flow diagram to illustrate a method for providing audio effects techniques as described herein, according to at least one embodiment.

FIG. 11 is another flow diagram to illustrate a method 1100 for providing audio effects techniques as described herein, according to at least one embodiment. Method 1100 may be performed at an electronic device having at least a speaker and a microphone. The operations of method 1100 may be performed in any suitable order by one or more processors in communication with the speaker and the microphone. Additional operations may be included, or at least one of the operations of method 1100 may be excluded in some embodiments.

The method 1100 may begin at 1102, where a voice audio signal corresponding to a user may be captured utilizing the microphone. By way of example, the user may an affordance of the virtual avatar generation interface 200 of FIG. 2 to begin capturing a voice audio signal.

At 1104, the voice audio signal may be transformed into a first set of voice audio features. The first set of voice audio features including a formant of the voice audio signal. In some embodiments, the voice audio signal may be transformed into the first set of voice audio features utilizing a Short-Term Fourier Transform.

Figure 13:
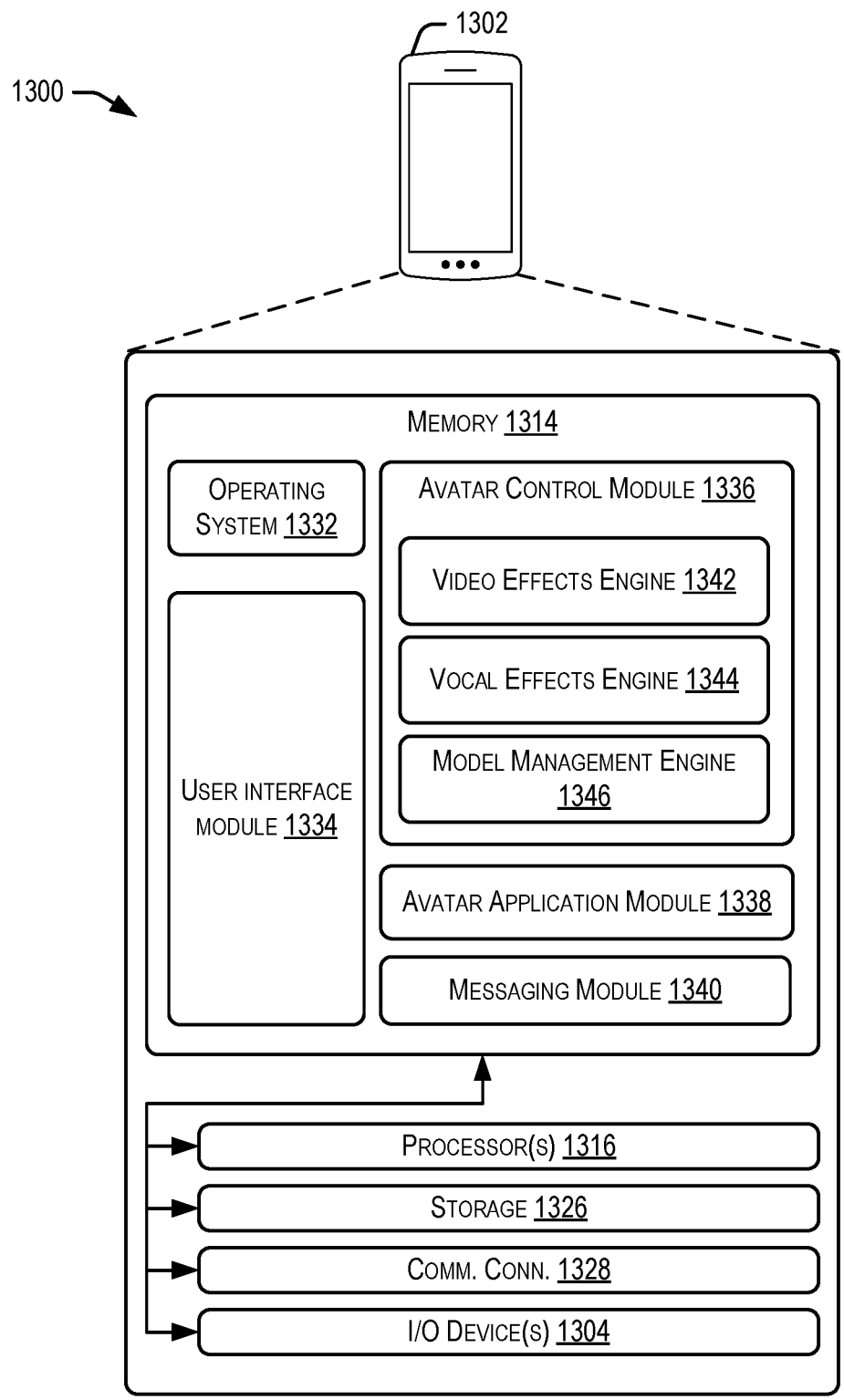
FIG. 13 is a simplified block diagram illustrating is a computer architecture for providing audio and/or video effects techniques as described herein, according to at least one embodiment.

At 1106, a feature set of a predetermined voice audio signal associated with the virtual avatar may be identified (e.g., by the vocal effects engine 1344 of FIG. 13). The feature set may include an envelope and/or a fine structure of the voice audio signal.

At 1108, a second set of voice audio features may be generated (e.g., by the vocal effects engine 1344) based at least in part on the first set of voice audio features and the feature set of the predetermined voice audio signal associated with the virtual avatar.

At 1110, a modified voice audio signal may be composed according to the second set of voice audio features. In some embodiments, composing the second set of voice audio features may include modifying at least one of the first set of voice audio features, replacing at least one of the first set of voice audio features, or the like.

At 1112, the modified voice audio signal may be presented at the speaker of the electronic device.

FIG. 12 is yet another flow diagram to illustrate another method 1200 for providing audio effects techniques as described herein, according to at least one embodiment. Method 1200 may be performed by one or more processors configured to execute computer-executable instructions stored on a computer-readable storage medium. The operations of method 1200 may be performed in any suitable order by one or more processors in communication with the speaker and the microphone. Additional operations may be included, or at least one of the operations of method 1200 may be excluded in some embodiments.

The method 1200 may begin at 1202, a selection associated with a virtual avatar is received at a virtual avatar generation interface, the virtual avatar being associated with particular vocal characteristics.

At 1204, a voice audio signal of a user may be captured utilizing a microphone and the virtual avatar generation interface.

At 1206, the voice audio signal of the user may be transformed (e.g., by the vocal effects engine 1344 of FIG. 13) into a first set of signal features. In some embodiments, the first set of signal features may include at least one of: an envelope identifying magnitude changes of the voice audio signal over time, a frequency of the voice audio signal, or a phase of the voice audio signal.

At 1208, a second set of voice audio features may be generated (e.g., by the vocal effects engine 1344) based at least in part on the first set of signal features and the particular vocal characteristics associated with the virtual avatar.

At 1210, a modified voice audio signal may be composed (e.g., by the vocal effects engine 1344) according to the second set of voice audio features. In some embodiments, the modified voice audio signal may provide content of the voice audio signal of the user based at least in part on the particular vocal characteristics associated with the virtual avatar.

At 1212, the modified voice audio signal may be presented at the speaker.

FIG. 13 is a simplified block diagram illustrating example architecture 1300 for implementing the features described herein, according to at least one embodiment. In some examples, computing device 1302 (e.g., computing device 106 of FIG. 1), having example architecture 1300, may be configured to present relevant UIs, capture audio and/or video information, extract relevant data, perform logic, revise the audio and video information, and present Animoji video and/or audio.

Computing device 1302 may be configured to execute or otherwise manage applications or instructions for performing the described techniques such as, but not limited to, providing a user interface (e.g., user interface 200 of FIG. 2) for recording, previewing, and/or sending virtual avatar video/audio clips. Computing device 1302 may receive inputs (e.g., utilizing I/O device(s) 1304 such as a touch screen) from a user at the user interface, capture information, process the information, and then present the video and/or clips as previews also utilizing I/O device(s) 1304 (e.g., a speaker of computing device 1302). Computing device 1302 may be configured to revise audio and/or video files based at least in part on facial features extracted from the captured video and/or voice features extracted from the captured audio.

Computing device 1302 may be any type of computing device such as, but not limited to, a mobile phone (e.g., a smartphone), a tablet computer, a personal digital assistant (PDA), a laptop computer, a desktop computer, a thin-client device, a smart watch, a wireless headset, or the like.

In one illustrative configuration, computing device 1302 may include at least one memory 1314 and one or more processing units (or processor(s)) 1316. Processor(s) 1316 may be implemented as appropriate in hardware, computer-executable instructions, or combinations thereof. Computer-executable instruction or firmware implementations of processor(s) 1316 may include computer-executable or machine-executable instructions written in any suitable programming language to perform the various functions described.

Memory 1314 may store program instructions that are loadable and executable on processor(s) 1316, as well as data generated during the execution of these programs. Depending on the configuration and type of computing device 1302, memory 1314 may be volatile (such as random access memory (RAM)) and/or non-volatile (such as read-only memory (ROM), flash memory, etc.). Computing device 1302 may also include additional removable storage and/or non-removable storage 1326 including, but not limited to, magnetic storage, optical disks, and/or tape storage. The disk drives and their associated non-transitory computer-readable media may provide non-volatile storage of computer-readable instructions, data structures, program modules, and other data for the computing devices. In some implementations, memory 1314 may include multiple different types of memory, such as static random access memory (SRAM), dynamic random access memory (DRAM), or ROM. While the volatile memory described herein may be referred to as RAM, any volatile memory that would not maintain data stored therein once unplugged from a host and/or power would be appropriate.

Memory 1314 and additional storage 1326, both removable and non-removable, are all examples of non-transitory computer-readable storage media. For example, non-transitory computer readable storage media may include volatile or non-volatile, removable or non-removable media implemented in any method or technology for storage of information such as computer-readable instructions, data structures, program modules, or other data. Memory 1314 and additional storage 1326 are both examples of non-transitory computer storage media. Additional types of computer storage media that may be present in computing device 1302 may include, but are not limited to, phase-change RAM (PRAM), SRAM, DRAM, RAM, ROM, electrically erasable programmable read-only memory (EEPROM), flash memory or other memory technology, compact disc read-only memory (CD-ROM), digital video disc (DVD) or other optical storage, magnetic cassettes, magnetic tape, magnetic disk storage or other magnetic storage devices, or any other medium that can be used to store the desired information and that can be accessed by computing device 1302. Combinations of any of the above should also be included within the scope of non-transitory computer-readable storage media.

Alternatively, computer-readable communication media may include computer-readable instructions, program modules, or other data transmitted within a data signal, such as a carrier wave, or other transmission. However, as used herein, computer-readable storage media does not include computer-readable communication media.

Computing device 1302 may also contain communications connection(s) 1328 that allow computing device 1302 to communicate with a data store, another computing device or server, user terminals and/or other devices via one or more networks. Such networks may include any one or a combination of many different types of networks, such as cable networks, the Internet, wireless networks, cellular networks, satellite networks, other private and/or public networks, or any combination thereof. Computing device 1302 may also include I/O device(s) 1304, such as a touch input device, a keyboard, a mouse, a pen, a voice input device, a display, a speaker, a printer, etc.

Turning to the contents of memory 1314 in more detail, memory 1314 may include operating system 1332 and/or one or more application programs or services for implementing the features disclosed herein including user interface module 1334, avatar control module 1336, avatar application module 1338, and messaging module 1340. Memory 1314 may also be configured to store one or more audio and video files to be used to produce audio and video output. In this way, computing device 1302 can perform all of the operations described herein.

In some examples, user interface module 1334 may be configured to manage the user interface of computing device 1302. For example, user interface module 1334 may present any number of various UIs requested by computing device 1302. In particular, user interface module 1334 may be configured to present UI 200 of FIG. 2, which enables implementation of the features describe herein, including communication with of the video effects engine 1342 (e.g., the video effects engine 308 of FIG. 3) and the vocal effects engine 1344 (e.g., the vocal effects engine 310 of FIG. 3) which are collectively responsible for capturing video and audio information, extracting appropriate facial feature and voice feature information, and revising the video and audio information prior to presentation of the generated avatar video/audio clips as described above. In some embodiments, the avatar control module 1336 may include model management engine 1346 which may be configured to store or access historical adjustments/modifications made to user's audio signals in the past to cause the user's audio signals to be modified to match, or substantially match, the audio signal and/or vocal characteristics of a voice (e.g., an audio signal) associated with an avatar. The model management engine 1346 may train a machine learning model utilizing various machine learning techniques (e.g., supervised learning techniques) to identify what modifications to make to an input audio signal in order to modify the audio signal to simulate the voice associated with the avatar. The machine-learning model can be trained with the historical adjustments/modifications made to past user's audio signals. In some embodiments, the machine-learning model may be trained using input voice audio signals that utter the same word(s) and/or phrase(s) as a target audio signal (e.g., associated with a particular avatar) in order to learn how to modify voice audio signals to more substantially match the target signal. Accordingly, the machine-learning model may obtain an audio signal of a user (or the voice audio features of the audio signal) and a selected avatar as input, and output information regarding the modifications needed to modify the audio signal of the user to match, or substantially match, the voice associated with the avatar. The output of the machine-learning model may be utilized by the vocal effects engine 1344 in order to modify the user's voice (e.g., the audio signal) to sound like the voice associated with the avatar.

In some examples, avatar control module 1336 is configured to implement (e.g., execute instructions for implementing) the processes described above while avatar application module 1338 is configured to implement the user facing application. As noted above, avatar application module 1338 may utilize one or more APIs for requesting and/or providing information to avatar control module 1336.

In some embodiments, messaging module 1340 may implement any standalone or add-on messaging application that can communicate with avatar control module 1336 and/or avatar application module 1338. In some examples, messaging module 1340 may be fully integrated with avatar application module 1338 (e.g., as seen in UI 200 of FIG. 2), where the avatar application appears to be part of the messaging application. However, in other examples, messaging application 1340 may call to avatar application module 1338 when a user requests to generate an avatar video/audio clip, and avatar application module 1338 may open up a new application altogether that is in integrated with messaging module 1340.

Computing device 1302 may also be equipped with a camera and microphone and processors 1316 may be configured to execute instructions to display a first preview of a virtual avatar. In some examples, while displaying the first preview of a virtual avatar, an input may be detected via a virtual avatar generation interface presented by user interface module 1334. In some instances, in response to detecting the input in the virtual avatar generation interface, avatar control module 1336 may initiate a capture session including: capturing, via the camera, a video signal associated with a face in a field of view of the camera, capturing, via the microphone, an audio signal associated with the captured video signal, extracting audio feature characteristics from the captured audio signal, and extracting facial feature characteristics associated with the face from the captured video signal. Additionally, in response to detecting expiration of the capture session, avatar control module 1336 may generate an adjusted audio signal based at least in part on the audio feature characteristics and the facial feature characteristics, and display a second preview of the virtual avatar in the virtual avatar generation interface according to the facial feature characteristics and the adjusted audio signal.

Illustrative methods, computer-readable medium, and systems for providing various techniques for adjusting audio and/or video content based at least in part on voice and/or facial feature characteristics are described above. Some or all of these systems, media, and methods may, but need not, be implemented at least partially by architectures and flows such as those shown at least in FIGS. 1-11 above. While many of the embodiments are described above with reference to messaging applications, it should be understood that any of the above techniques can be used within any type of application including real-time video playback or real-time video messaging applications. For purposes of explanation, specific configurations and details are set forth in order to provide a thorough understanding of the examples. However, it should also be apparent to one skilled in the art that the examples may be practiced without the specific details. Furthermore, well-known features were sometimes omitted or simplified in order not to obscure the example being described.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Non-transitory storage media and computer-readable storage media for containing code, or portions of code, can include any appropriate media known or used in the art (except for transitory media like carrier waves or the like) such as, but not limited to, volatile and non-volatile, removable and non-removable media implemented in any method or technology for storage of information such as computer-readable instructions, data structures, program modules or other data, including RAM, ROM, Electrically Erasable Programmable Read-Only Memory (EEPROM), flash memory or other memory technology, CD-ROM, DVD or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments. However, as noted above, computer-readable storage media does not include transitory media such as carrier waves or the like.

As described above, one aspect of the present technology is the collection and use of the user's voice and/or image. The present disclosure contemplates that in some instances, this gathered data may include personal information data that uniquely identifies or can be used to contact or locate a specific person. The present disclosure recognizes that the use of such personal information data, in the present technology, can be used to the benefit of users. For example, the personal information data can be used to customize an Animoji with the vocal behaviors of the user as well as the user's physical behavior characteristics.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of the vocal effects engine, the present technology can be configured to allow users to select to "opt in" or "opt out" of participation in the collection of personal information data (or some portion of their personal information data) during registration for services or anytime thereafter. In another example, users can select not to provide personal information data for the purposes of customizing an Animoji. In yet another example, users can select to limit the length of time personal information data is maintained or entirely prohibit the user of proactive reminders and/or notifications. In addition to providing "opt in" and "opt out" options, the present disclosure contemplates providing notifications relating to the access or use of personal information.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, data de-identification can be used to protect a user's privacy. De-identification may be facilitated, when appropriate, by removing specific identifiers, controlling the amount or specificity of data stored, controlling how data is stored, and/or other methods.

Therefore, although the present disclosure broadly covers use of personal information data to implement one or more various disclosed embodiments, the present disclosure also contemplates that the various embodiments can also be implemented without the need for accessing such personal information data.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a," "an," and "the," and similar referents in the context of describing the disclosed embodiments (especially in the context of the following claims), are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise be read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method, comprising:
    at an electronic device having at least a camera and a microphone:
        displaying a virtual avatar generation interface;
        displaying first preview content of a virtual avatar in the virtual avatar generation interface, the first preview content of the virtual avatar corresponding to real-time preview video frames of a user headshot in a field of view of the camera and associated headshot changes in an appearance;
        while displaying the first preview content of the virtual avatar, detecting an input in the virtual avatar generation interface;
        in response to detecting the input in the virtual avatar generation interface:
            capturing, via the camera, a video signal associated with the user headshot during a recording session;
            capturing, via the microphone, a voice audio signal during the recording session; and
            in response to detecting expiration of the recording session:
                transforming the voice audio signal into a first set of voice audio features, the first set of voice audio features including at least one speech formant of the voice audio signal;
                identifying a feature set of a predetermined voice audio signal associated with the virtual avatar;
                generating a second set of voice audio features based at least in part on the first set of voice audio features and the feature set of the predetermined voice audio signal associated with the virtual avatar, the second set of voice audio features including a modified version of the at least one speech formant of the voice audio signal; and
                composing a modified voice audio signal based at least in part on the second set of voice audio features;
                generating second preview content of the virtual avatar in the virtual avatar generation interface according to the video signal and the modified voice audio signal; and
                presenting the second preview content in the virtual avatar generation interface.

2. The method of claim 1, wherein the first set of voice audio features includes an envelope and fine structure of the voice audio signal, the envelope representing a magnitude of the voice audio signal over time, the fine structure include at least one of a frequency or a phase of the voice audio signal.

3. The method of claim 1, wherein transforming the voice audio signal into the first set of voice audio features includes utilizing a short-term Fourier transform.

4. The method of claim 3, wherein composing the modified voice audio signal includes utilizing an inverse short-term Fourier transform.

5. An electronic device, comprising:
    a speaker;
    a camera;
    a microphone; and
    one or more processors in communication with the speaker, the camera, and the microphone, the one or more processors configured to:
        display a virtual avatar generation interface;
        display first preview content of a virtual avatar in the virtual avatar generation interface, the first preview content of the virtual avatar corresponding to real-time preview video frames of a user headshot in a field of view of the camera and associated headshot changes in an appearance;
        while displaying the first preview content of the virtual avatar, detect an input in the virtual avatar generation interface;
        in response to detecting the input in the virtual avatar generation interface:
            capture, via the camera, a video signal associated with the user headshot during a recording session;
            capture, utilizing the microphone, a voice audio signal during the recording; and
            in response to detecting expiration of the recording session:
                transform the voice audio signal into a first set of voice audio features, the first set of voice audio features including a formant of the voice audio signal;
                identify a feature set of a predetermined voice audio signal associated with a virtual avatar;
                generate a second set of voice audio features based at least in part on the first set of voice audio features and the feature set of the predetermined voice audio signal associated with the virtual avatar; and
                compose a modified voice audio signal according to the second set of voice audio features;
                generate second preview content of the virtual avatar in the virtual avatar generation interface according to the video signal and the modified voice audio signal; and
                present the second preview content in the virtual avatar generation interface.

6. The electronic device of claim 5, wherein the feature set of the predetermined voice audio signal is based at least in part on a type of the virtual avatar.

7. The electronic device of claim 6, wherein the type of the virtual avatar is received based at least in part a user selection of an avatar type selection option presented on a user interface of the electronic device.

8. The electronic device of claim 5, wherein the first set of voice audio features includes a formant of the voice audio signal, and wherein the second set of voice audio features is generated based at least in part on shifting the formant of the first set of voice audio features.

9. The electronic device of claim 5, wherein the second set of voice audio features generated modify the voice audio signal to simulate the predetermined voice audio signal associated with the virtual avatar.

10. The electronic device of claim 5, wherein the first set of voice audio features including an envelope and a fine structure of the voice audio signal, the envelope representing a magnitude of the voice audio signal over time, the fine structure representing at least one of a frequency or a phase of the voice audio signal.

11. The electronic device of claim 10, wherein the second set of voice audio features are generated based at least in part on modifying the phase of the voice audio signal, and wherein modifying the phase of the voice audio signal causes the modified voice audio signal composed from the second set of voice audio features to simulate the predetermined voice audio signal associated with the virtual avatar.

12. The electronic device of claim 10, wherein the second set of voice audio features are generated based at least in part on modifying the magnitude and the phase of the voice audio signal according to the feature set of the predetermined voice audio signal associated with the virtual avatar.

13. The electronic device of claim 5, wherein the one or more processors are further configured to:
generate a machine-learning model from past signal modifications associated with individually modifying a plurality of voice audio signals associated with a plurality of users to substantially match the predetermined voice audio signal associated with the virtual avatar, the machine-learning model being configured to receive a voice audio signal feature set as input and produce a resultant voice audio signal feature set as output;
provide, to the machine-learning model, the first set of voice audio features associated with the voice audio signal corresponding to a user; and
obtain, from the machine-learning model, the second set of voice audio features, wherein the modified voice audio signal composed from the second set of voice audio features causes the voice audio signal of the user to be substantially match a vocal signal associated with the virtual avatar.

14. The electronic device of claim 13, wherein the one or more processors are further configured to:
extract facial feature characteristics associated with the face from the video signal; and
generate adjusted facial metadata based at least in part on the facial feature characteristics and the modified voice audio signal.

15. The electronic device of claim 14, wherein the modified voice audio signal is presented with a visual representation of the virtual avatar in the second preview content of the virtual avatar generation interface, the visual representation of the virtual avatar being presented based at least in part on the adjusted facial metadata.

16. A non-transitory computer-readable storage medium storing computer-executable instructions that, when executed by one or more processors, configure the one or more processors to perform operations comprising:

displaying a virtual avatar generation interface;
receiving, at the virtual avatar generation interface, a selection associated with a virtual avatar, the virtual avatar being associated with particular vocal characteristics;
displaying first preview content of the virtual avatar in the virtual avatar generation interface, the first preview content of the virtual avatar corresponding to real-time preview video frames of a user headshot in a field of view of the camera and associated headshot changes in an appearance;
while displaying the first preview content of the virtual avatar, detecting an input in the virtual avatar generation interface;
in response to detecting the input in the virtual avatar generation interface:
  capturing, utilizing a camera, a video signal associated with the user headshot during a recording session;
  capturing, utilizing a microphone and the virtual avatar generation interface, a voice audio signal during the recording session; and
in response to detecting expiration of the recording session:
  transforming the voice audio signal of the user into a first set of voice audio features, the first set of voice audio features including at least one of speech formant of the voice audio signal;
  generating a second set of voice audio features based at least in part on the first set of voice audio features and the particular vocal characteristics associated with the virtual avatar; and
  composing a modified voice audio signal according to the second set of voice audio features;
generating second preview content of the virtual avatar in the virtual avatar generation interface according to the video signal and the modified voice audio signal; and
presenting the second preview content in the virtual avatar generation interface.

17. The non-transitory computer-readable storage medium of claim 16, wherein the second set of voice audio features are generating based at least in part on replacing the phase with a predetermined phase associated with the virtual avatar.

18. The non-transitory computer-readable storage medium of claim 16, wherein transforming the voice audio signal of the user into a first set of signal features utilizes a short-term Fourier transform of the first set of signal features, and wherein composing the modified voice audio signal according to the second set of voice audio features utilizes an inverse short-term Fourier transform of the second set of voice audio features.

19. The non-transitory computer-readable storage medium of claim 18, wherein the one or more processors are further configured to perform operations comprising:
identifying a formant of the voice audio signal based at least in part on the envelope; and
modifying the formant according to a window function, wherein modifying the formant according to the window function causes the formant to widen or contract.

20. The non-transitory computer-readable storage medium of claim 16, wherein the one or more processors are further configured to perform operations comprising:
extracting facial feature characteristics associated with the face from the video signal;
generating adjusted facial metadata based at least in part on the facial feature characteristics and the modified voice audio signal; and presenting, with the modified voice audio signal, a visual representation of the virtual avatar in the second preview content of the virtual avatar generation interface according to the adjusted facial metadata.

\* \* \* \* \*